US012675090B2

(12) United States Patent
Sasaki et al.

(10) Patent No.: US 12,675,090 B2
(45) Date of Patent: Jul. 7, 2026

(54) CAM CURVE GENERATING DEVICE AND CAM CURVE GENERATING METHOD

(71) Applicant: Panasonic Intellectual Property Management Co., Ltd., Osaka (JP)

(72) Inventors: Ryuta Sasaki, Osaka (JP); Susumu Emi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 539 days.

(21) Appl. No.: 18/250,224

(22) PCT Filed: Nov. 24, 2021

(86) PCT No.: PCT/JP2021/042976
§ 371 (c)(1),
(2) Date: Apr. 24, 2023

(87) PCT Pub. No.: WO2022/118707
PCT Pub. Date: Jun. 9, 2022

(65) Prior Publication Data
US 2023/0409002 A1      Dec. 21, 2023

(30) Foreign Application Priority Data

Dec. 3, 2020    (JP) ................................. 2020-200931
Nov. 1, 2021    (WO) .................. PCT/JP2021/040197

(51) Int. Cl.
*G05B 19/40*          (2006.01)
(52) U.S. Cl.
CPC .... *G05B 19/40* (2013.01); *G05B 2219/35108* (2013.01)

(58) Field of Classification Search
CPC .......... G05B 19/40; G05B 2219/35108; G05B 2219/34343; G05B 19/416
See application file for complete search history.

(56) References Cited

U.S. PATENT DOCUMENTS 8,624,413 B2 *   1/2014   Tsutsumi .............. F03D 7/0244
                                                            290/44
9,536,446 B2 *   1/2017   Vatcher .................. A63G 31/16
                        (Continued)

FOREIGN PATENT DOCUMENTS

JP        2006-172438          6/2006

OTHER PUBLICATIONS

The EPC Office Action dated Apr. 16, 2024 for the related European Patent Application No. 21900462.9.
(Continued)

*Primary Examiner* — Carlos R Ortiz Rodriguez
(74) *Attorney, Agent, or Firm* — Rimon P.C.

(57)          ABSTRACT
Provided is cam curve generating device that generates a cam curve that is smoothly connected to an out-section cam curve and reduces fluctuations in speed of a driven shaft and acceleration of the driven shaft. Cam curve generating device includes section divider that divides an application section into a plurality of sub-sections, and cam curve generator that generates a cam curve in the application section. The division condition includes a length and the type of each of the plurality of sub-sections. The boundary condition includes a position, speed, and acceleration of the driven shaft at each of a start and an end of the application section. Cam curve generator generates a cam curve that allows a position of the driven shaft, speed of the driven shaft, and acceleration of the driven shaft to be continuous at each of boundaries of the plurality of sub-sections.

20 Claims, 6 Drawing Sheets

(56)         References Cited

U.S. PATENT DOCUMENTS

2006/0144187 A1    7/2006  Maeda
2012/0035771 A1    2/2012  Maekawa et al.
2013/0317653 A1    11/2013  Ueda et al.

OTHER PUBLICATIONS

International Search Report of PCT application No. PCT/JP2021/
042976 dated Feb. 8, 2022.

* cited by examiner

CAM CURVE GENERATING DEVICE AND CAM CURVE GENERATING METHOD

TECHNICAL FIELD

The present disclosure relates to a cam curve generating device that generates a cam curve for implementing electronic cam control for controlling a position of a driven shaft in synchronization with a position of a main shaft.

BACKGROUND ART

There has been known a technique for generating a cam curve smoothly connected to an out-section cam curve outside a section when a boundary condition between a start of the section and an end of the section is given (e.g., see PTL 1). Here, the smooth connection between the out-section cam curve and the cam curve generated means that a position of the driven shaft, speed of the driven shaft, and acceleration of the driven shaft at a connection point are continuous in the out-section cam curve and the cam curve generated. Additionally, certain physical quantities continuous between the out-section cam curve and the cam curve generated at the connection point mean that the physical quantities are equal at the connection point.

CITATION LIST

Patent Literature

PTL 1: Unexamined Japanese Patent Publication No. 2006-172438

SUMMARY OF THE INVENTION

According to a conventional technique of generating a cam curve, a cam curve corresponding boundary conditions at a start of a section and an end of the section is uniquely determined. This technique may generate a cam curve that causes relatively large fluctuation in speed of a driven shaft or in acceleration of the driven shaft in an application section depending on the boundary conditions at the start of the section and the end of the section.

Thus, it is an object of the present disclosure to provide a cam curve generating device, a cam curve generating method, and a program for causing the cam curve generating device to execute a cam curve generation processing, which are each capable of generating a cam curve that reduces fluctuations in speed of the driven shaft and in acceleration of the driven shaft in an application section while being smoothly connected to an out-section cam curve.

A cam curve generating device according to an aspect of the present disclosure controls a position of a driven shaft by electronic cam control. The cam curve generating device includes a boundary condition acquisition part, a division condition acquisition part, a section divider, and a cam curve generator. The boundary condition acquisition part acquires a boundary condition of an application section to be a target of generation of the cam curve in a range in which the main shaft changes in position. The division condition acquisition part acquires a division condition for dividing the application section into multiple sub-sections. The section divider divides the application section into the multiple sub-sections that satisfy the division condition. The cam curve generator generates a cam curve in the application section, the cam curve satisfying the boundary condition. Each of the multiple sub-sections is any one of types of a sub-section in which acceleration of the driven shaft monotonously increases, a sub-section in which the acceleration of the driven shaft monotonously decreases, and a sub-section in which the acceleration of the driven shaft does not change. The division condition includes a length and a type of each of the multiple sub-sections. The boundary condition includes a position of the driven shaft, speed of the driven shaft, and acceleration of the driven shaft at each of a start and an end of the application section. The cam curve generator further generates the cam curve that allows a position of the driven shaft, speed of the driven shaft, and acceleration of the driven shaft to be continuous at each of boundaries of the multiple sub-sections.

A cam curve generating method according to another aspect of the present disclosure is for generating a cam curve for implementing electronic cam control for controlling a position of a driven shaft. The cam curve generating method includes a first step, a second step, a third step, and a fourth step. The first step is performed to acquire a boundary condition of an application section to be a target of generation of the cam curve in a range in which the main shaft changes in position. The second step is performed to acquire a division condition for dividing the application section into multiple sub-sections. The third step is performed to divide the application section into the multiple sub-sections that satisfy the division condition. The fourth step is performed to generate the cam curve in the application section, the cam curve satisfying the boundary condition. Each of the multiple sub-sections is any one of types of a sub-section in which acceleration of the driven shaft monotonously increases, a sub-section in which the acceleration of the driven shaft monotonously decreases, and a sub-section in which the acceleration of the driven shaft does not change. The division condition includes a length and a type of each of the multiple sub-sections. The boundary condition includes a position of the driven shaft, speed of the driven shaft, and acceleration of the driven shaft at each of a start and an end of the application section. The fourth step is performed to further generate a cam curve that allows a position of the driven shaft, speed of the driven shaft, and acceleration of the driven shaft to be continuous at each of boundaries of the multiple sub-sections.

A program according to yet another aspect of the present disclosure is for causing a cam curve generating device to perform a cam curve generation processing of generating a cam curve for implementing electronic cam control for controlling a position of a driven shaft. The program includes a first step, a second step, a third step, and a fourth step. The cam curve generation processing is performed in the first step to acquire a boundary condition of an application section to be a target of generation of the cam curve in a range in which the main shaft changes in position. The second step is performed to acquire a division condition for dividing the application section into multiple sub-sections. The third step is performed to divide the application section into the multiple sub-sections that satisfy the division condition. The fourth step is performed to generate the cam curve in the application section, the cam curve satisfying the boundary condition. Each of the multiple sub-sections is any one of types of a sub-section in which acceleration of the driven shaft monotonously increases, a sub-section in which the acceleration of the driven shaft monotonously decreases, and a sub-section in which the acceleration of the driven shaft does not change. The division condition includes a length and a type of each of the multiple sub-sections. The boundary condition includes a position of the driven shaft, speed of the driven shaft, and acceleration of the driven shaft at each of a start and an end of the application section. The fourth step is performed to generate the cam curve that allows a position of the driven shaft, speed of the driven shaft, and acceleration of the driven shaft to be continuous at each of boundaries of the multiple sub-sections.

The cam curve generating device and the cam curve generating method according to the present disclosure enables generating a cam curve that reduces fluctuations in speed of the driven shaft and in acceleration of the driven shaft in an application section while being smoothly connected to an out-section cam curve.

DESCRIPTION OF EMBODIMENT

Figure 1:
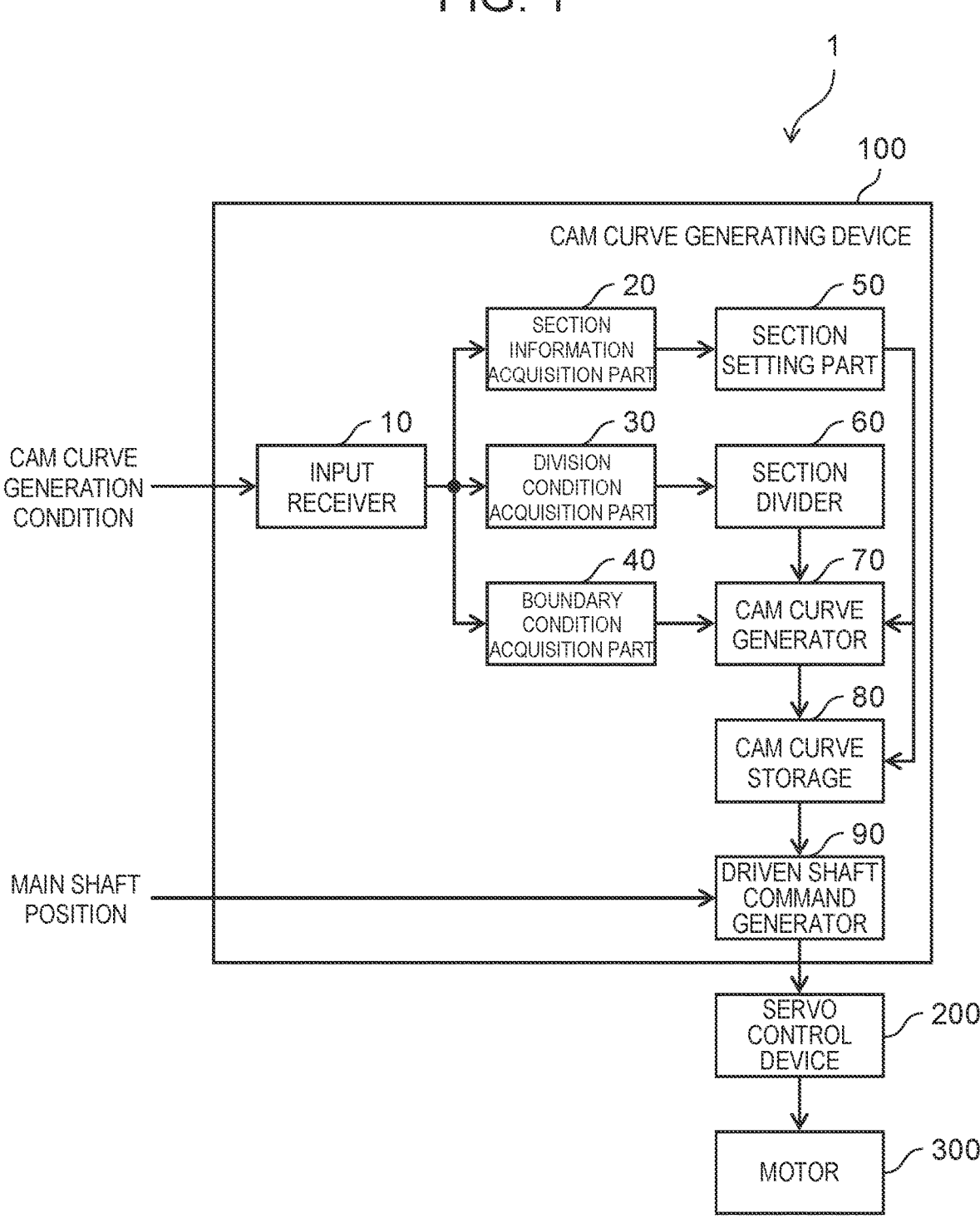
FIG. 1 is a block diagram illustrating an example of a configuration of a cam curve generation system according to a first exemplary embodiment.

Background of Obtaining One Aspect of Present Disclosure

Industrial equipment exists to repeatedly and continuously perform a series of processing processes, such as a pillow packaging machine that packages a product with a film by cutting the film in predetermined dimensions to seal the product while continuously feeding the film. This kind of industrial equipment includes multiple shafts for performing a series of processing processes, and performs a required operation while synchronizing the multiple shafts with each other.

Known examples of a method for synchronizing multiple shafts with each other include a method for applying a cyclic motion to a driven shaft using a cam mechanism mechanically attached to a drive shaft serving as a main shaft, and a method for cyclically driving each driven shaft in a pattern of a position signal correlated with another shaft using a servomotor. Examples of the latter include a method for controlling a driven shaft by electronic cam control.

The method for controlling a driven shaft by electronic cam control is performed to output a position command of the driven shaft to the servo motor based on a cam curve defining a relationship between a position of the main shaft and a position of the driven shaft. The method for controlling a driven shaft by electronic cam control has advantages of facilitating change in operation pattern and enabling simplification of a mechanism as compared with a method for controlling a driven shaft using a mechanical cam mechanism.

The cam curve is generated according to an operation pattern required for the industrial equipment. Known methods for generating a cam curve include a method for dividing an operation pattern into multiple sections, generating a cam curve for each section, and connecting cam curves of the multiple sections to generate one cam curve.

Examples of a known method for a driven shaft being an end sealer shaft of a pillow packaging machine include a method for generating a cam curve by dividing the cam curve into at least two sections of a section (also referred to below as a "sealing section") from a start position to an end position of one sealing and a period (also referred to below as a "relay section") from the end position of the one sealing to a start position of next sealing.

The sealing section requires a sealing surface of the end sealer to be in contact with a predetermined sealing part of a film, so that moving speed of the end sealer is uniquely determined with respect to transport speed of the film. As a result, the cam curve of the end sealer shaft in the sealing section is uniquely determined.

In contrast, the relay section allows the sealing surface of the end sealer to operate away from the film, so that the moving speed of the end sealer can be defined ambiguously with respect to the transport speed of the film. As a result, the cam curve of the end sealer shaft in the relay section is ambiguously determined.

When an operation pattern is divided into multiple sections and a cam curve is generated for each section, speed of a driven shaft obtained by first differentiating the cam curve at a position of a main shaft and acceleration of the driven shaft obtained by second differentiating the cam curve may be discontinuous at a boundary between two adjacent sections.

This kind of discontinuity causes rapid change in speed, acceleration, and the like of the driven shaft near the boundary. The rapid change in speed and acceleration of the driven shaft causes relatively large acceleration, torque, jerk, and the like in the driven shaft, and thus causing vibration or impact to be applied to the industrial equipment.

To prevent such vibration or impact applied to the industrial equipment, a cam curve needs to be generated in a first section in which a cam curve is ambiguously determined, such as the relay section in the pillow packaging machine described above, while having a smooth connection to a cam curve of a second section in which a cam curve is uniquely determined, the second section being adjacent to the first section. Known examples of a technique for generating such a cam curve include a conventional technique described in PTL 1.

This conventional technique allows a cam curve having a smooth connection to an out-section cam curve to be generated at a boundary with an adjacent section by using a cam curve in which a position of a driven shaft with respect to a position of a main shaft is defined by a quintic function, speed of the driven shaft with respect to the position of the main shaft is defined by a quartic function, and acceleration of the driven shaft with respect to the position of the main shaft is defined by a cubic function.

Unfortunately, the above-described conventional technique gives boundary conditions at a start of a section and an end of the section to cause a cam curve to be uniquely determined in shape according to the boundary conditions. As a result, this technique may cause speed of a driven shaft or acceleration of the driven shaft to fluctuate relatively largely in an application section depending on the boundary conditions at the start of the section and the end of the section.

When fluctuation of the speed of the driven shaft or the acceleration of the driven shaft increases, vibration or impact applied to the industrial equipment increases more. Additionally, a motor capable of drawing higher speed and torque is required, and thus causing increase in cost, size, weight, and the like of industrial equipment.

Thus, the inventors have intensively repeated experiments and studies on a cam curve generating device capable of generating a cam curve that reduces fluctuations in speed of the driven shaft and in acceleration of the driven shaft in an application section while being smoothly connected to an out-section cam curve.

As a result, the inventors have conceived the cam curve generating device below and the like, and the cam curve generating method below.

A cam curve generating device according to an aspect of the present disclosure generates a cam curve of electronic cam control for controlling a position of a driven shaft. The cam curve generating device includes a boundary condition acquisition part, a division condition acquisition part, a section divider, and a cam curve generator. The boundary condition acquisition part acquires a boundary condition of an application section to be a target of generation of the cam curve in a range in which the main shaft changes in position. The division condition acquisition part divides the application section into multiple sub-sections. The section divider divides the application section into the multiple sub-sections that satisfy the division condition. The cam curve generator generates the cam curve in the application section, the cam curve satisfying the boundary condition. Each of the multiple sub-sections is any one of types of a sub-section in which acceleration of the driven shaft monotonously increases, a sub-section in which the acceleration of the driven shaft monotonously decreases, and a sub-section in which the acceleration of the driven shaft does not change. The division condition includes a length and a type of each of the multiple sub-sections. The boundary condition includes a position of the driven shaft, speed of the driven shaft, and acceleration of the driven shaft at each of a start and an end of the application section. The cam curve generator generates the cam curve that allows a position of the driven shaft, speed of the driven shaft, and acceleration of the driven shaft to be continuous at each of boundaries of the multiple sub-sections.

The cam curve generating device having the above configuration causes the driven shaft to be determined in position, speed, and acceleration at the start and the end of the application section according to boundary conditions acquired. As a result, the cam curve generating device having the above configuration enables generating a cam curve having a smooth connection to an out-section cam curve outside the application section by appropriately setting a boundary condition to be acquired.

The cam curve generating device having the above configuration determines speed of the driven shaft and acceleration of the driven shaft in the application section according to a division condition acquired. As a result, the cam curve generating device having the above configuration enables generating a cam curve that reduces fluctuations in speed of the driven shaft and in acceleration of the driven shaft in the application section by appropriately setting a division condition to be acquired.

Thus, the cam curve generating device having the above configuration enables generating a cam curve that reduces fluctuations in speed of the driven shaft and in acceleration of the driven shaft in an application section while being smoothly connected to an out-section cam curve.

In at least one sub-section of a type in which the acceleration of the driven shaft monotonically increases or monotonically decreases, the cam curve generator may generate the cam curve with a waveform of the acceleration of the driven shaft from a start to an end of the at least one sub-section, the waveform having a shape of a ¼ period part up to the apex of a sine wave.

In at least one sub-section of the type in which the acceleration of the driven shaft monotonically increases or monotonically decreases, the cam curve generator may generate the cam curve with a waveform of the acceleration of the driven shaft from the start to the end of the at least one sub-section, the waveform having a shape of a half period part from the apex of the sine wave.

In at least one sub-section of the type in which the acceleration of the driven shaft monotonically increases or monotonically decreases, the cam curve generator may generate the cam curve with a waveform of the acceleration of the driven shaft from the start to the end of the at least one sub-section, the waveform having a shape of a ¼ period part from the apex of the sine wave.

In at least one sub-section of the type in which the acceleration of the driven shaft monotonically increases or monotonically decreases, the cam curve generator may generate the cam curve with a waveform of the acceleration of the driven shaft from the start to the end of the at least one sub-section, the waveform being defined by a linear polynomial of a position of the main shaft.

The multiple sub-sections may be five sub-sections that include a first sub-section, a second sub-section, a third sub-section, a fourth sub-section, and a fifth sub-section, and that are sequentially continuous. The first sub-section, the third sub-section, and the fifth sub-section may be each a sub-section of a type in which acceleration of the driven shaft monotonically increases or monotonically decreases, and the second sub-section and the fourth sub-section may be each a sub-section of a type in which the acceleration of the driven shaft does not change.

The acceleration of the driven shaft in the second sub-section and the fourth sub-section may have a value other than zero.

The multiple sub-sections may be seven sub-sections that include a first sub-section, a second sub-section, a third sub-section, a fourth sub-section, a fifth sub-section, a sixth sub-section, and a seventh sub-section, and that are sequentially continuous. The first sub-section, the third sub-section, the fifth sub-section, and the seventh sub-section may be each a sub-section of a type in which the acceleration of the driven shaft monotonically increases or monotonically decreases. The second sub-section, the fourth sub-section, and the sixth sub-section may be each a sub-section of a type in which the acceleration of the driven shaft does not change.

The acceleration of the driven shaft in the second sub-section and the sixth sub-section may have a value other than zero, and the acceleration of the driven shaft in the fourth sub-section may be zero.

Additionally, a section setting part that divides a range in which the main shaft changes in position into the application section and a non-application section other than the application section may be provided.

An existing cam curve storage and a boundary condition calculator may be further provided. The existing cam curve storage stores an existing cam curve generated in advance. The boundary condition calculator calculates values below. Specifically, the values to be calculated from the existing cam curve include: a first position of the driven shaft at a first position of a main shaft; first speed of the driven shaft at the first position of the main shaft; first acceleration of the driven shaft at the first position of the main shaft; a second position of the main shaft at a time after the first position of the main shaft; second speed of the driven shaft at the second position of the main shaft; and second acceleration of the driven shaft at the second position of the main shaft. Then, boundary conditions shown below are calculated for a first section from the first position of the main shaft to the second position of the main shaft, the first section being defined as the application section in the range in which the main shaft changes in position in the existing cam curve. Specifically, the boundary conditions to be calculated include a first boundary condition where the first position of the driven shaft, the first speed of the driven shaft, and the first acceleration of the driven shaft are respectively defined as a position of the driven shaft at the start, speed of the driven shaft at the start, and acceleration of the driven shaft at the start. The boundary conditions to be calculated also include a second boundary condition where the second position of the driven shaft, the second speed of the driven shaft, and the second acceleration of the driven shaft are respectively defined as a position of the driven shaft at the end, speed of the driven shaft at the end, and acceleration of the driven shaft at the end. The boundary condition acquisition part acquires the first boundary condition at the start and the second boundary condition at the end, which are calculated by the boundary condition calculator. The division condition acquisition part acquires the division condition where the first section is defined as the application section. The section divider defines the first section as the application section and divides the application section into the multiple sub-sections. The cam curve generator may generate the cam curve with the first section as the application section.

A cam curve generating method according to another aspect of the present disclosure is for generating a cam curve for implementing electronic cam control for controlling a position of a driven shaft. The cam curve generating method includes a first step, a second step, a third step, and a fourth step. The first step is performed to acquire a boundary condition of an application section to be a target of generation of the cam curve in a range in which the main shaft changes in position. The second step is performed to acquire a division condition for dividing the application section into multiple sub-sections. The third step is performed to divide the application section into the multiple sub-sections that satisfy the division condition. The fourth step is performed to generate the cam curve in the application section, the cam curve satisfying the boundary condition. Each of the multiple sub-sections is any one of types of a sub-section in which acceleration of the driven shaft monotonously increases, a sub-section in which the acceleration of the driven shaft monotonously decreases, and a sub-section in which the acceleration of the driven shaft does not change. The division condition includes a length and a type of each of the multiple sub-sections. The boundary condition includes a position of the driven shaft, speed of the driven shaft, and acceleration of the driven shaft at each of a start and an end of the application section. The fourth step is performed to further generate the cam curve that allows a position of the driven shaft, speed of the driven shaft, and acceleration of the driven shaft to be continuous at each of boundaries of the multiple sub-sections.

The cam curve generating method causes the driven shaft to be determined in position, speed, and acceleration at the start and the end of the application section according to boundary conditions acquired. As a result, the cam curve generating method enables generating a cam curve having a smooth connection to an out-section cam curve outside the application section by appropriately setting a boundary condition to be acquired.

The cam curve generating method determines speed of the driven shaft and acceleration of the driven shaft in the application section according to a division condition acquired. As a result, the cam curve generating method enables generating a cam curve that reduces fluctuations in speed of the driven shaft and in acceleration of the driven shaft in the application section by appropriately setting a division condition to be acquired.

The cam curve generating method then enables generating a cam curve that reduces fluctuations in speed of the driven shaft and in acceleration of the driven shaft in an application section while being smoothly connected to an out-section cam curve.

A program according to yet another aspect of the present disclosure is for causing a cam curve generating device to perform a cam curve generation processing of generating a cam curve for implementing electronic cam control for controlling a position of a driven shaft. The program includes a first step, a second step, a third step, and a fourth step. The cam curve generation processing is performed in the first step to acquire a boundary condition of an application section to be a target of generation of the cam curve in a range in which the main shaft changes in position. The second step is performed to acquire a division condition for dividing the application section into multiple sub-sections. The third step is performed to divide the application section into the multiple sub-sections that satisfy the division condition. The fourth step is performed to generate the cam curve in the application section, the cam curve satisfying the boundary condition. Each of the multiple sub-sections is any one of types of a sub-section in which acceleration of the driven shaft monotonously increases or monotonously decreases, and a sub-section in which the acceleration of the driven shaft does not change. The division condition includes a length and a type of each of the multiple sub-sections. The boundary condition includes a position of the driven shaft, speed of the driven shaft, and acceleration of the driven shaft at each of a start and an end of the application section. The fourth step is performed to further generate a cam curve that allows a position of the driven shaft, speed of the driven shaft, and acceleration of the driven shaft to be continuous at each of boundaries of the multiple sub-sections.

The program causes the driven shaft to be determined in position, speed, and acceleration at the start and the end of the application section according to boundary conditions acquired. As a result, the program enables generating a cam curve having a smooth connection to an out-section cam curve outside the application section by appropriately setting a boundary condition to be acquired.

The program determines speed of the driven shaft and acceleration of the driven shaft in the application section according to a division condition acquired. As a result, the program enables generating a cam curve that reduces fluctuations in speed of the driven shaft and in acceleration of the driven shaft in the application section by appropriately setting a division condition to be acquired.

The program then enables generating a cam curve that reduces fluctuations in speed of the driven shaft and in acceleration of the driven shaft in an application section while being smoothly connected to an out-section cam curve.

Hereinafter, specific examples of a cam curve generating device and a cam curve generating method according to aspects of the present disclosure will be described with reference to the drawings. Exemplary embodiments to be described herein each illustrate a specific example of the present disclosure. Numerical values, shapes, constituent components, arrangement positions and connection modes of the constituent components, steps, order of the steps, and the like illustrated in the exemplary embodiments below are merely examples, and thus are not intended to limit the present disclosure. Each of the drawings is a schematic view, and is not necessarily precisely illustrated.

Comprehensive or specific aspects of the present disclosure may be achieved by a system, a method, an integrated circuit, a computer program, or a recording medium such as a computer-readable CD-ROM, or may be achieved by any combination of the system, the method, the integrated circuit, the computer program, and the recording medium.

First Exemplary Embodiment

Here, an electronic cam control system that performs electronic cam control for controlling a position of a driven shaft in synchronization with a position of a main shaft will be described with reference to the drawings.

<Configuration>

FIG. 1 is a block diagram illustrating an example of a configuration of cam curve generation system 1 according to a first exemplary embodiment.

As illustrated in FIG. 1, cam curve generation system 1 includes cam curve generating device 100, servo control device 200, and motor 300.

Cam curve generating device 100 generates a cam curve for implementing electronic cam control for controlling a position of a driven shaft in synchronization with a position of a main shaft, the cam curve defining a relationship between the position of the main shaft and the position of the driven shaft.

The cam curve may be a function that defines the relationship between the position of the main shaft and the position of the driven shaft, or may be a data table, for example.

The cam curve may further define a relationship between the position of the main shaft and speed of the driven shaft, a relationship between the position of the main shaft and acceleration of the driven shaft, or a relationship between the position of the main shaft and a jerk of the driven shaft, for example. That is, the cam curve may further include a function that defines the relationship between the position of the main shaft and the speed of the driven shaft, the relationship between the position of the main shaft and the acceleration of the driven shaft, or the relationship between the position of the main shaft and the jerk of the driven shaft, or may include a data table.

Cam curve generating device 100 also generates and outputs a command to the driven shaft based on the cam curve generated and a main shaft position indicating a position of the main shaft. The command may be a position command, a speed command, or a torque command, for example.

Here, the main shaft position is a position signal serving as a reference for synchronization of cam curve generation system 1. The main shaft position may be a position command to the main shaft, a signal indicating a position of the main shaft acquired by an external device such as a pulser or an encoder, a signal indicating a position of a shaft other than the main shaft, the shaft operating in synchronization with the main shaft, or a signal indicating a position of a movable part of industrial equipment such as a belt conveyor, for example. When the main shaft position is a position command to the main shaft, cam curve generating device 100 may generate the position command. Additionally, the main shaft is not necessarily an actual shaft, but may be a virtual shaft.

Motor 300 drives the driven shaft.

Motor 300 is controlled by servo control device 200 based on a command to the driven shaft output from cam curve generating device 100.

As illustrated in FIG. 1, cam curve generating device 100 includes input receiver 10, section information acquisition part 20, division condition acquisition part 30, boundary condition acquisition part 40, section setting part 50, section divider 60, cam curve generator 70, cam curve storage 80, and driven shaft command generator 90.

Cam curve generating device 100 may be composed of a computer including a processor and a memory, for example. In this case, each of components constituting cam curve generating device 100 may be implemented by the processor executing a program stored in a memory, for example.

Input receiver 10 receives input of a cam curve generation condition.

The cam curve generation condition includes section information indicating an application section to be a target of generation for which the cam curve is generated in a range in which the main shaft changes in position, a boundary condition of the application section, and a division condition for dividing the application section into multiple sub-sections.

Section information acquisition part 20 acquires section information from the cam curve generation condition received by input receiver 10. Although the section information is here described as being included in the cam curve generation condition, the section information may be determined in advance, for example. In this case, section information acquisition part 20 may store predetermined section information instead of acquiring the section information from the cam curve generation condition received by input receiver 10.

As an example that is not necessarily limited, the section information is indicated by a coordinate value in an xy orthogonal coordinate system in which a position of the main shaft is along x-axis (horizontal axis) and a position of the driven shaft is along y-axis (vertical axis), for example. The coordinate value may be only the position of the main shaft, or may be the position of the main shaft and the position of the driven shaft, for example. Here, the coordinate value will be described as the position of the main shaft and the position of the driven shaft.

Section setting part 50 divides the range in which the main shaft changes in position into an application section and a non-application section other than the application section based on the section information acquired by section information acquisition part 20. As a result, section setting part 50 sets the application section and the non-application section.

The application section corresponds to a first section in which a cam curve is ambiguously determined, such as a relay section in which the driven shaft is an end sealer shaft of a pillow packaging machine, and the non-application section corresponds to a second section in which the cam curve is uniquely determined, such as a seal section in which the driven shaft is the end sealer shaft of the pillow packaging machine.

When determining the application section and the non-application section, section setting part 50 acquires an out-section cam curve defining a relationship between a position of the main shaft and a position of the driven shaft in the non-application section from the outside or generates the out-section cam curve.

To generate the out-section cam curve, the section setting part 50 may acquire dimensions of various components in the industrial equipment, operation conditions in a processing process performed by the industrial equipment, and the like from the outside in addition to coordinate values in the section information to generate the out-section cam curve based on the coordinate values, the dimensions, the operation conditions, and the like.

The out-section cam curve may further define a relationship between the position of the main shaft and speed of the driven shaft, a relationship between the position of the main shaft and acceleration of the driven shaft, or a relationship between the position of the main shaft and a jerk of the driven shaft, in the non-application section, for example.

The out-section cam curve acquired or generated by section setting part 50 is stored in cam curve storage 80 described later.

Division condition acquisition part 30 acquires the division condition from the cam curve generation condition received by input receiver 10. Although the division condition is here described as being included in the cam curve generation condition, the division condition may be determined in advance, for example. In this case, division condition acquisition part 30 may store a predetermined division condition instead of acquiring the division condition from the cam curve generation condition received by input receiver 10.

The division condition includes the number of divisions indicating the number of multiple sub-sections to be acquired by division, a length of each of the multiple sub-sections, and a type of each of the multiple sub-sections.

Here, the length of each sub-section is information that enables calculation of a difference between a position of the main shaft at the start of the sub-section and a position of the main shaft at the end of the sub-section. As an example that is not necessarily limited, the length of the sub-section is an interval between the position of the main shaft at the start of the sub-section and the position of the main shaft at the end of the sub-section, for example.

Here, the type is information indicating whether the sub-section has acceleration of the driven shaft that monotonously increases or monotonously decreases, or has acceleration of the driven shaft that does not change.

The section divider 60 divides the application section into multiple sub-sections based on the division condition acquired by division condition acquisition part 30, the multiple sub-sections satisfying the division condition.

As a result, the section divider 60 divides the application section into any one of types of sub-section, the types including a type in which the acceleration of the driven shaft monotonously increases or monotonously decreases, and a type in which the acceleration of the driven shaft does not change.

When dividing the application section into multiple sub-sections, section divider 60 outputs information indicating each sub-section to cam curve generator 70. The information indicating the sub-section may be a coordinate value of a position of the main shaft at a boundary of the sub-section and the type of the sub-section, for example.

Boundary condition acquisition part 40 acquires a boundary condition from the cam curve generation condition received by input receiver 10.

The boundary condition includes a position of the driven shaft, speed of the driven shaft, and acceleration of the driven shaft at each of a start and an end of the application section.

Although the boundary condition is here described as being included in the cam curve generation condition, the boundary condition may be determined in advance, for example. In this case, boundary condition acquisition part 40 may store a predetermined boundary condition instead of acquiring the boundary condition from the cam curve generation condition received by input receiver 10.

Boundary condition acquisition part 40 may also generate the boundary condition from the out-section cam curve stored in cam curve storage 80 instead of acquiring the boundary condition from the cam curve generation condition received by input receiver 10. In this case, boundary condition acquisition part 40 may calculate a position of the driven shaft, speed of the driven shaft, and acceleration of the driven shaft at an end of a non-application cam curve of a non-application section adjacent in front of the application section as a position of the driven shaft, speed of the driven shaft, and acceleration of the driven shaft at the start of the application section, respectively, for example. Alternatively, a position of the driven shaft, speed of the driven shaft, and acceleration of the driven shaft at a start of a non-application cam curve of a non-application section adjacent behind the application section may be calculated as a position of the driven shaft, speed of the driven shaft, and acceleration of the driven shaft at the end of the application section, respectively, for example.

Cam curve generator 70 generates a cam curve in the application section based on the boundary condition acquired by boundary condition acquisition part 40, the cam curve satisfying the boundary condition. At this time, cam curve generator 70 generates the cam curve that allows a position of the driven shaft, speed of the driven shaft, and acceleration of the driven shaft to be continuous at each of boundaries of the multiple sub-sections based on the information indicating the sub-sections output from section divider 60.

A specific example of the cam curve generated by cam curve generator 70 will be described later.

Cam curve storage 80 stores the cam curve generated by cam curve generator 70. As described above, cam curve storage 80 stores the out-section cam curve acquired or generated by section setting part 50.

Cam curve storage 80 may store a cam curve or an out-section cam curve itself. When the cam curve or the out-section cam curve is a function that defines a relationship between a position of the main shaft and a position of the driven shaft, cam curve storage 80 may store factor data on the function. When the cam curve or the out-section cam curve is a data table that defines the relationship between a position of the main shaft and a position of the driven shaft, cam curve storage 80 may store a numerical value of data constituting the data table.

Driven shaft command generator 90 acquires the main shaft position, and generates and outputs a command to the driven shaft based on the main shaft position, and the cam curve or the out-section cam curve stored in cam curve storage 80.

<Operation>

Cam curve generating device 100 having the above configuration performs a first cam curve generation processing of generating a cam curve, for example.

Hereinafter, the first cam curve generation processing to be performed by cam curve generating device 100 will be described with reference to the drawings.

Figure 2:
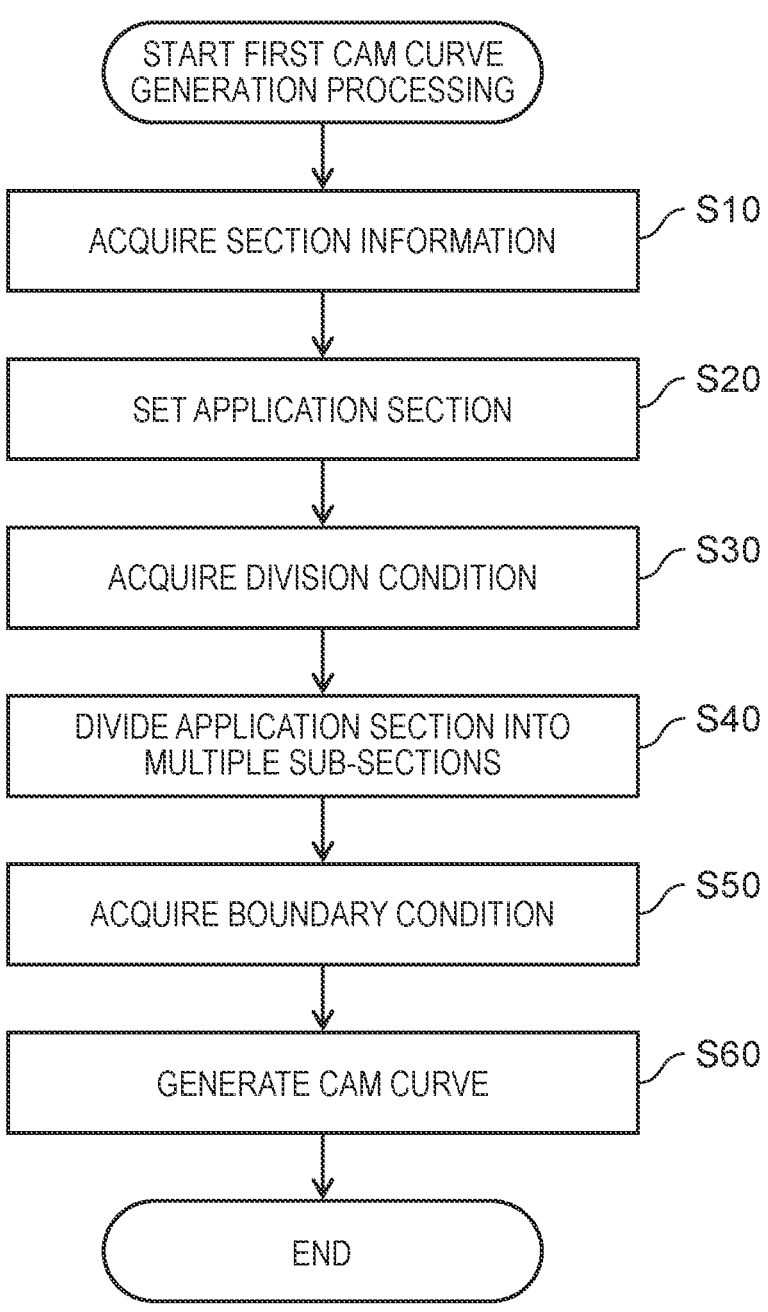
FIG. 2 is a flowchart of a first cam curve generation processing according to the first exemplary embodiment.

FIG. 2 is a flowchart of the first cam curve generation processing.

The first cam curve generation processing is started when cam curve generating device 100 is operated to start the first cam curve generation processing, for example.

When the first cam curve generation processing is started, section information acquisition part 20 acquires section information (step S10). More specifically, section information acquisition part 20 acquires the section information from the cam curve generation condition received by input receiver 10. When the section information is acquired by section information acquisition part 20, section setting part 50 sets an application section and a non-application section based on the section information (step S20).

Next, division condition acquisition part 30 acquires a division condition (step S30). More specifically, division condition acquisition part 30 acquires the division condition from the cam curve generation condition received by input receiver 10. When the division condition is acquired by division condition acquisition part 30, section divider 60 divides the application section into multiple sub-sections based on the division condition, the multiple sub-sections satisfying the division condition (step S40). Then, section divider 60 outputs information indicating each sub-section to cam curve generator 70.

Subsequently, boundary condition acquisition part 40 acquires a boundary condition (step S50). More specifically, boundary condition acquisition part 40 acquires the boundary condition from the cam curve generation condition received by input receiver 10. When the boundary condition is acquired by boundary condition acquisition part 40, cam curve generator 70 generates a cam curve in the application section based on the boundary condition acquired by boundary condition acquisition part 40, the cam curve satisfying the boundary condition. At this time, cam curve generator 70 generates the cam curve that allows a position of the driven shaft, speed of the driven shaft, and acceleration of the driven shaft to be continuous at each of boundaries of the multiple sub-sections based on the information indicating the sub-sections output from section divider 60 (step S60).

When processing in step S60 ends, cam curve generating device 100 ends the first cam curve generation processing.

Specific Example

Hereinafter, specific processing contents of the processing in step S60 will be described with reference to the drawings.

Figure 3:
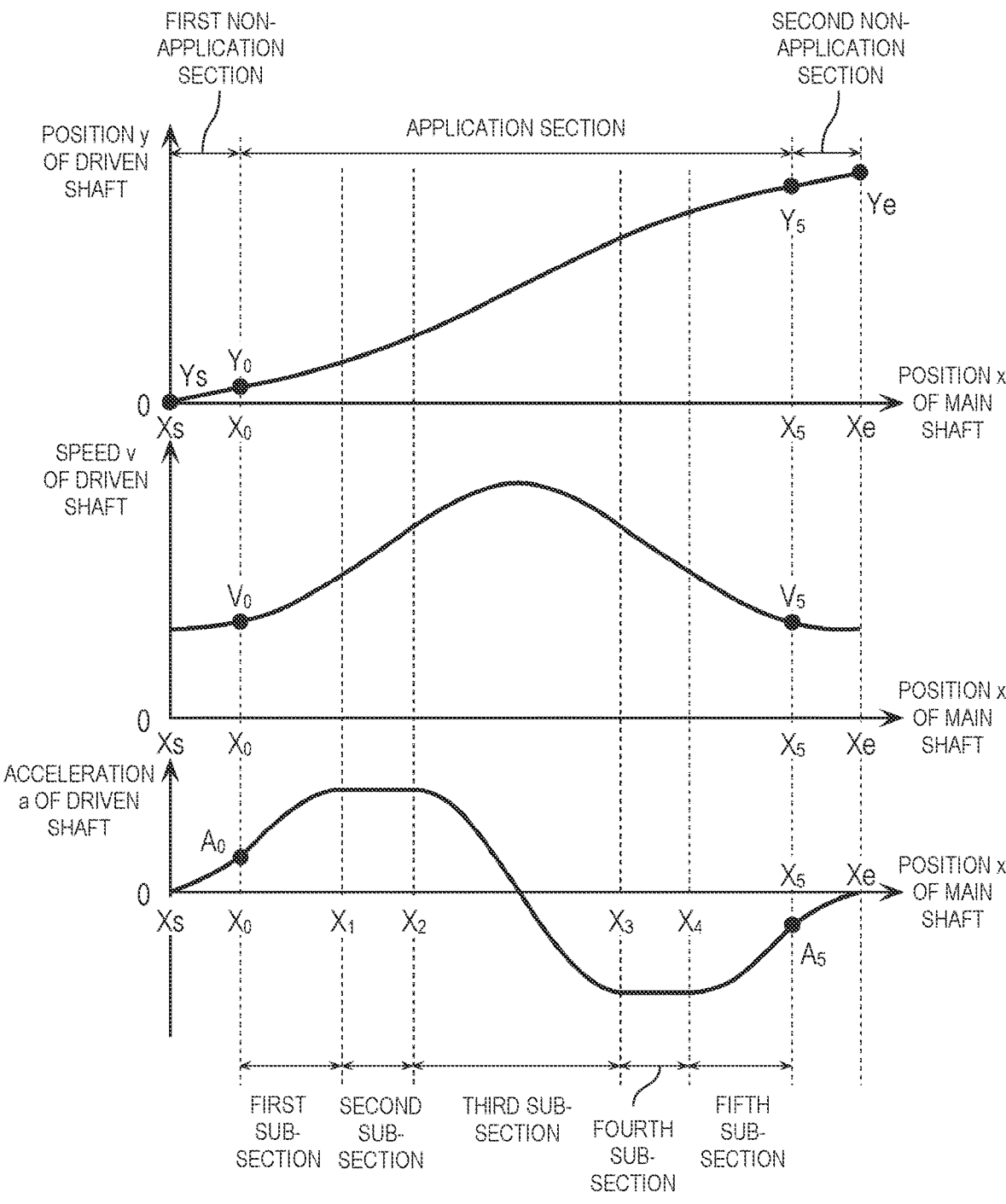
FIG. 3 is a waveform chart illustrating an example of a cam curve according to the first exemplary embodiment.

FIG. 3 is a waveform diagram illustrating an example of the cam curve generated by cam curve generator 70 in the processing in step S60.

FIG. 3 includes a waveform chart in an upper row, the waveform chart showing a cam curve that defines a relationship between a position of the main shaft and a position of the driven shaft. The waveform chart in the upper row has the horizontal axis (x-axis) indicating position x of the main shaft, and the vertical axis (y-axis) indicating position y of the driven shaft.

FIG. 3 includes a waveform chart in a middle row, the waveform chart showing a cam curve that defines a relationship between a position of the main shaft and speed of the driven shaft. The waveform chart in the middle row has the horizontal axis (x-axis) indicating position x of the main shaft, and the vertical axis (v-axis) indicating speed v of the driven shaft.

FIG. 3 includes a waveform chart in a lower row, the waveform chart showing a cam curve that defines a relationship between a position of the main shaft and acceleration of the driven shaft. The waveform chart in the lower row has the horizontal axis (x-axis) indicating position x of the main shaft, and the vertical axis (a-axis) indicating acceleration a of the driven shaft.

FIG. 3 includes the waveform chart in the upper row, waveform chart in the middle row, and the waveform chart in the lower row, each of which has a first section from position $X_0$ to position $X_5$ of the main shaft, the first section being set as an application section, a second section from position $X_s$ to position $X_0$ of the main shaft, the second section being set as a first non-application section, and a third section from position $X_5$ to position $X_e$ of the main shaft, the third section being set as a second non-application section. That is, the cam curve in the application section from position $X_0$ to position $X_5$ of the main shaft is the cam curve generated by cam curve generator 70 in the processing in step S60.

For example, the waveform chart in the upper row of FIG. 3 shows the application section with boundaries that are indicated by coordinate values of $(X_0, Y_0)$ and $(X_5, Y_5)$.

The application section has the start under a boundary condition set to coordinate values equal to those at the end of the cam curve in the first non-application section, i.e., position $Y_0$ of the driven shaft, speed $V_0$ of the driven shaft, and acceleration $A_0$ of the driven shaft. The application section also has the end under a boundary condition set to coordinate values equal to those at the start of the cam curve in the second non-application section, i.e., position $Y_5$ of the driven shaft, speed $V_5$ of the driven shaft, and acceleration $A_5$ of the driven shaft.

The example illustrated in FIG. 3 shows the application section that is divided into five sub-sections of a first sub-section, a second sub-section, a third sub-section, a fourth sub-section, and a fifth sub-section that are continuous in an ascending order of the position of the main shaft. The five sub-sections have boundaries indicated by positions of the main shaft, the positions having respective coordinate values of $X_0$, $X_1$, $X_2$, $X_3$, $X_4$, $X_5$.

The first sub-section, the third sub-section, and the fifth sub-section are each set as a sub-section of a type in which acceleration of the driven shaft monotonically increases or monotonically decreases. The second sub-section and the fourth sub-section are each set as a sub-section of a type in which the acceleration of the driven shaft does not change.

The processing in step S60 allows cam curve generator 70 to define acceleration a of the driven shaft in the first sub-section to the fifth sub-section by a function a(x) of position x of the main shaft shown in Expression 1 below. Expression 1 shows $K_{iT}$ (i=1, 3, 5) and $K_{i2}$ (i=1, 2, 3, 4, 5) that are each a coefficient.

(Expression 1)

$$\Delta x = x - X_{i-1}, \Delta X_i = X_i - X_{i-1} \qquad \text{[Expression 1]}$$

and $$\text{[Expression 2]}$$

$$a(x) =$$

$$\begin{cases} a_1(x) = K_{12} + K_{1T} \sin\left(\pi \dfrac{\Delta x}{2\Delta X_1}\right) & , X_0 \le x \le X_1 \\[2mm] a_3(x) = K_{32} + K_{3T} \cos\left(\pi \dfrac{\Delta x}{\Delta X_3}\right) & , X_2 \le x \le X_3 \\[2mm] a_5(x) = K_{52} + K_{5T} \cos\left(\pi \dfrac{\Delta x}{2\Delta X_5}\right) & , X_4 \le x \le X_5 \\[2mm] a_i(x) = K_{12} & , X_{i-1} \le x \le X_i, i = 2, 4 \end{cases}$$

Expression 1 defines acceleration a of the driven shaft in the first sub-section with a sine wave with a waveform from the start to the end of the first sub-section, the waveform transitioning in phase from 0 to $\pi \times \frac{1}{2}$. That is, the waveform from the start to the end of the first sub-section of acceleration a of the driven shaft in the first sub-section has a shape of a ¼ period part up to the apex of the sine wave. The term, "apex", used herein includes both a positive apex and a negative apex. Acceleration a of the driven shaft in the third sub-section is defined with a sine wave with a waveform from the start to the end of the third sub-section, the waveform transitioning in phase from $\pi \times \frac{1}{2}$ to $\pi \times 3/2$. That is, the waveform from the start to the end of the third sub-section of acceleration a of the driven shaft in the third sub-section has a shape of a half period part from the apex of the sine wave. Acceleration a of the driven shaft in the fifth sub-section is defined with a sine wave with a waveform from the start to the end of the fifth sub-section, the waveform transitioning in phase from $\pi \times 3/2$ to $\pi \times 2$. That is, the waveform from the start to the end of the fifth sub-section of acceleration a of the driven shaft in the fifth sub-section has a shape of a ¼ period part from the apex of the sine wave.

These functions are examples, and as long as acceleration a of the driven shaft monotonically increases or monotonithe apex of the sine wave. Acceleration a of the driven shaft in the third sub-section may be defined with a sine wave with a waveform from the start to the end of the third sub-section, the waveform transitioning in phase from $\pi \times (-\frac{1}{2})$ to $\pi \times \frac{1}{2}$. That is, the waveform from the start to the end of the third sub-section of acceleration a of the driven shaft in the third sub-section may have a shape of a half period part from the apex of the sine wave. Acceleration a of the driven shaft in the fifth sub-section may be defined with a sine wave with a waveform from the start to the end of the fifth sub-section, the waveform transitioning in phase from $\pi \times \frac{1}{2}$ to $\pi$. That is, the waveform from the start to the end of the fifth sub-section of acceleration a of the driven shaft in the fifth sub-section may have a shape of a ¼ period part from the apex of the sine wave.

When Expression 1 is integrated at position x of the main shaft, function v(x) defining speed v of the driven shaft in the first sub-section to the fifth sub-section is obtained as Expression 2 below. Expression 2 shows $K_{i1}$ (i=1, 2, 3, 4, 5) that is an integral constant and a coefficient.

(Expression 2)

$$\Delta x = x - X_{i-1}, \Delta X_i = X_i - X_{i-1} \qquad \text{[Expression 3]}$$

and

[Expression 4]

$$v(x) =$$

$$\begin{cases} v_1(x) = K_{11} + K_{12}\Delta x - K_{1T}\dfrac{2\Delta X_1}{\pi}\cos\left(\pi\dfrac{\Delta x}{2\Delta X_1}\right) & , X_0 \le x \le X_1 \\[2mm] v_3(x) = K_{31} + K_{32}\Delta x - K_{3T}\dfrac{\Delta X_3}{\pi}\sin\left(\pi\dfrac{\Delta x}{\Delta X_3}\right) & , X_2 \le x \le X_3 \\[2mm] v_5(x) = K_{51} + K_{52}\Delta x - K_{5T}\dfrac{2\Delta X_5}{\pi}\sin\left(\pi\dfrac{\Delta x}{2\Delta X_5}\right) & , X_4 \le x \le X_5 \\[2mm] v_i(x) = K_{i1} + K_{i2}\Delta x & , X_{i-1} \le x \le X_i, i = 2, 4 \end{cases}$$

cally decreases in the first sub-section, the third sub-section, and the fifth sub-section, the functions in these sections may be any function. For example, acceleration a of the driven shaft in the first sub-section may be defined with a sine wave with a waveform from the start to the end of the first When Expression 2 is integrated at position x of the main shaft, function y(x) defining position y of the driven shaft in the first sub-section to the fifth sub-section is obtained as Expression 3 below. Expression 3 shows $K_{i0}$ (i=1, 2, 3, 4, 5) that is an integral constant and a coefficient.

(Expression 3)

$$\Delta x = x - X_{i-1}, \Delta X_i = X_i - X_{i-1} \qquad \text{[Expression 5]}$$

and

[Expression 6]

$$y(x) = \begin{cases} y_1(x) = K_{10} + K_{11}\Delta x + \dfrac{1}{2}K_{12}\Delta x^2 - K_{1T}\dfrac{4\Delta X_1^2}{\pi^2}\sin\left(\pi\dfrac{\Delta x}{2\Delta X_1}\right) & , X_0 \le x \le X_1 \\[2mm] y_3(x) = K_{30} + K_{31}\Delta x + \dfrac{1}{2}K_{32}\Delta x^2 - K_{3T}\dfrac{\Delta X_3^2}{\pi^2}\cos\left(\pi\dfrac{\Delta x}{\Delta X_3}\right) & , X_2 \le x \le X_3 \\[2mm] y_5(x) = K_{50} + K_{51}\Delta x + \dfrac{1}{2}K_{52}\Delta x^2 - K_{5T}\dfrac{4\Delta X_5^2}{\pi^2}\cos\left(\pi\dfrac{\Delta x}{2\Delta X_5}\right) & , X_4 \le x \le X_5 \\[2mm] y_i(x) = K_{i0} + K_{i1}\Delta x + \dfrac{1}{2}K_{12}\Delta x^2 & , X_{i-1} \le x \le X_i, i = 2, 4 \end{cases}$$

sub-section, the waveform transitioning in phase from $\pi$ to $\pi \times 3/2$. That is, the waveform from the start to the end of the first sub-section of acceleration a of the driven shaft in the first sub-section may have a shape of a ¼ period part up to Expression 1, Expression 2, and Expression 3 include $K_{iT}$ (i=1, 3, 5), $K_{i2}$ (i=1, 2, 3, 4, 5), $K_{i1}$ (i=1, 2, 3, 4, 5), and $K_{i0}$ (i=1, 2, 3, 4, 5), which are each a coefficient of a cam curve or a factor thereof. Although being unknown until the processing in step S60 is performed, these are calculated by cam curve generator 70 in the processing in step S60.

The examples of Expression 1, Expression 2, and Expression 3 have eighteen unknowns as described above, so that as many conditions as the unknowns, i.e., eighteen conditions, are required for calculating the unknowns. As described below, the processing in step S60 allows cam curve generator 70 to calculate the eighteen unknowns based on a total of eighteen conditions including six boundary conditions at the start and end of the application section, and twelve continuous conditions at boundaries of each sub-section, including a position of the driven shaft, speed of the driven shaft, and acceleration of the driven shaft.

Boundary conditions $Y_0$, $V_0$, and $A_0$ at the start of the application section illustrated in FIG. 3, i.e., at position $X_0$ of the main shaft in the first sub-section, are substituted into Expression 1, Expression 2, and Expression 3 to obtain three equations shown in Expression 4 below.

(Expression 4)

$$A_0 = a_1(X_0) \rightarrow A_0 = K_{12} \qquad \text{[Expression 7]}$$

$$V_0 = v_1(X_0) \rightarrow V_0 = K_{11} - K_{1T}\frac{2\Delta X_1}{\pi}$$

$$Y_0 = y_1(X_0) \rightarrow Y_0 = K_{10}$$

Boundary conditions $Y_5$, $V_5$, $A_5$ at the end of the application section illustrated in FIG. 3, i.e., at position $X_5$ of the main shaft in the fifth sub-section, are substituted into Expression 1, Expression 2, and Expression 3 to obtain three equations shown in Expression 5 below.

(Expression 5)

$$\Delta X_5 = X_5 - X_4 \qquad \text{[Expression 8]}$$

and $$A_5 = a_5(X_5) \rightarrow A_5 = K_{52} + K_{5T} \qquad \text{[Expression 9]}$$

$$V_5 = v_5(X_5) \rightarrow V_5 = K_{51} + K_{52}\Delta X_5$$

$$Y_5 = y_5(X_5) \rightarrow Y_5 = K_{50} + K_{51}\Delta X_5 + \frac{1}{2}K_{52}\Delta X_5^2 - K_{5T}\frac{4\Delta X_5^2}{\pi^2}$$

When a condition that acceleration a of the driven shaft is continuous at the boundary of each sub-section illustrated in FIG. 3 is given to Expression 1, four equations shown in Expression 6 below are obtained.

(Expression 6)

$$\Delta X_i = X_i - X_{i-1} \text{ and} \qquad \text{[Expression 10]}$$

$$a_1(X_1) = a_2(X_1) \rightarrow K_{12} + K_{1T} = K_{22} \qquad \text{[Expression 11]}$$

$$a_2(X_2) = a_3(X_2) \rightarrow K_{22} = K_{32} + K_{3T}$$

$$a_3(X_3) = a_4(X_3) \rightarrow K_{32} + K_{3T} = K_{42}$$

$$a_4(X_4) = a_5(X_4) \rightarrow K_{42} + K_{52} = K_{5T}$$

When a condition that speed v of the driven shaft is continuous at the boundary of each sub-section illustrated in FIG. 3 is given to Expression 2, four equations shown in Expression 7 below are obtained.

(Expression 7)

$$\Delta X_i = X_i - X_{i-1} \text{ and} \qquad \text{[Expression 12]}$$

$$v_1(X_1) = v_2(X_1) \rightarrow K_{11} + K_{12}\Delta X_1 = K_{21} \qquad \text{[Expression 13]}$$

$$v_2(X_2) = v_3(X_2) \rightarrow K_{21} + K_{22}\Delta X_2 = K_{31}$$

$$v_3(X_3) = v_4(X_3) \rightarrow K_{31} + K_{32}\Delta X_3 = K_{41}$$

$$v_4(X_4) = v_5(X_4) \rightarrow K_{41} + K_{42}\Delta X_4 = K_{51}$$

When a condition that position y of the driven shaft is continuous at the boundary of each sub-section illustrated in FIG. 3 is given to Expression 3, four equations shown in Expression 8 below are obtained.

(Expression 8)

$$\Delta X_i = X_i - X_{i-1}$$

and

[Expression 14]

[Expression 15]

$$y_1(X_1) = y_2(X_1) \rightarrow K_{10} + K_{11}\Delta X_1 + \frac{1}{2}K_{12}\Delta X_1^2 - K_{1T}\frac{4\Delta X_1^2}{\pi^2} = K_{20}$$

$$y_2(X_2) = y_3(X_2) \rightarrow K_{20} + K_{21}\Delta X_2 + \frac{1}{2}K_{22}\Delta X_2^2 = K_{30} - K_{3T}\frac{\Delta X_3^2}{\pi^2}$$

$$y_3(X_3) = y_4(X_3) \rightarrow K_{30} + K_{31}\Delta X_3 + \frac{1}{2}K_{32}\Delta X_3^2 + K_{3T}\frac{\Delta X_3^2}{\pi^2} = K_{40}$$

$$y_4(X_4) = y_5(X_4) \rightarrow K_{40} + K_{41}\Delta X_4 + \frac{1}{2}K_{42}\Delta X_4^2 = K_{50} - K_{5T}\frac{4\Delta X_5^2}{\pi^2}$$

The processing in step S60 allows cam curve generator 70 to solve eighteen simultaneous equations defined by the eighteen equations shown in Expression 4 to Expression 8 to calculate unknowns $K_{iT}$ (i=1, 3, 5), $K_{i2}$ (i=1, 2, 3, 4, 5), $K_{i1}$ (i=1, 2, 3, 4, 5), and $K_{i0}$ (i=1, 2, 3, 4, 5).

Cam curve generator 70 may calculate corresponding one of the unknowns by solving the eighteen simultaneous equations each time a cam curve is generated, or may preliminarily store a calculation formula obtained by modifying the eighteen simultaneous equations and calculate each of the unknowns based on the calculation formula stored.

Next, an example of an effect obtained by cam curve generating device 100 will be described using an example of a cam curve illustrated in FIG. 3.

The cam curve in the application section in FIG. 3 has a start indicated by position $X_0$ of the main shaft, the start having position $Y_0$ of the driven shaft, speed $V_0$ of the driven shaft, and acceleration $A_0$ of the driven shaft, which are equal to those at an end of the cam curve of the first non-application section adjacent to the application section. The cam curve also has an end indicated by position $X_5$ of the main shaft, the end having position $Y_5$ of the driven shaft, speed $V_5$ of the driven shaft, and acceleration $A_5$ of the driven shaft, which are equal to those at a start of the cam curve of the second non-application section adjacent to the application section. As described above, cam curve generating device 100 generates the cam curve of the application section, the cam curve having the start and the end that are each in a shape smoothly connected to the adjacent non-application section. As a result, cam curve generating device 100 enables providing electronic cam control in which speed of the driven shaft and acceleration of the driven shaft do not change rapidly near the boundary between the application section and the non-application section.

The cam curve in the application section in FIG. 3 has a second sub-section and a fourth sub-section in which acceleration a of the driven shaft is constant, and position y of the driven shaft, speed v of the driven shaft, and acceleration a of the driven shaft are each continuous at boundaries of each sub-section. As a result, cam curve generating device 100 enables providing electronic cam control that reduces fluctuation in speed of the driven shaft and acceleration of the driven shaft in the application section as compared with electronic cam control using a cam curve generated using a fifth-order curve as in the conventional technique described in PTL 1.

Cam curve generating device 100 can generate a wide variety of cam curves because a length of each sub-section can be appropriately set. As a result, cam curve generating device 100 enables providing electronic cam control of a wide variety of acceleration and deceleration patterns as compared with the electronic cam control using the cam curve generated using the fifth-order curve as in the conventional technique described in PTL 1.

Figure 4:
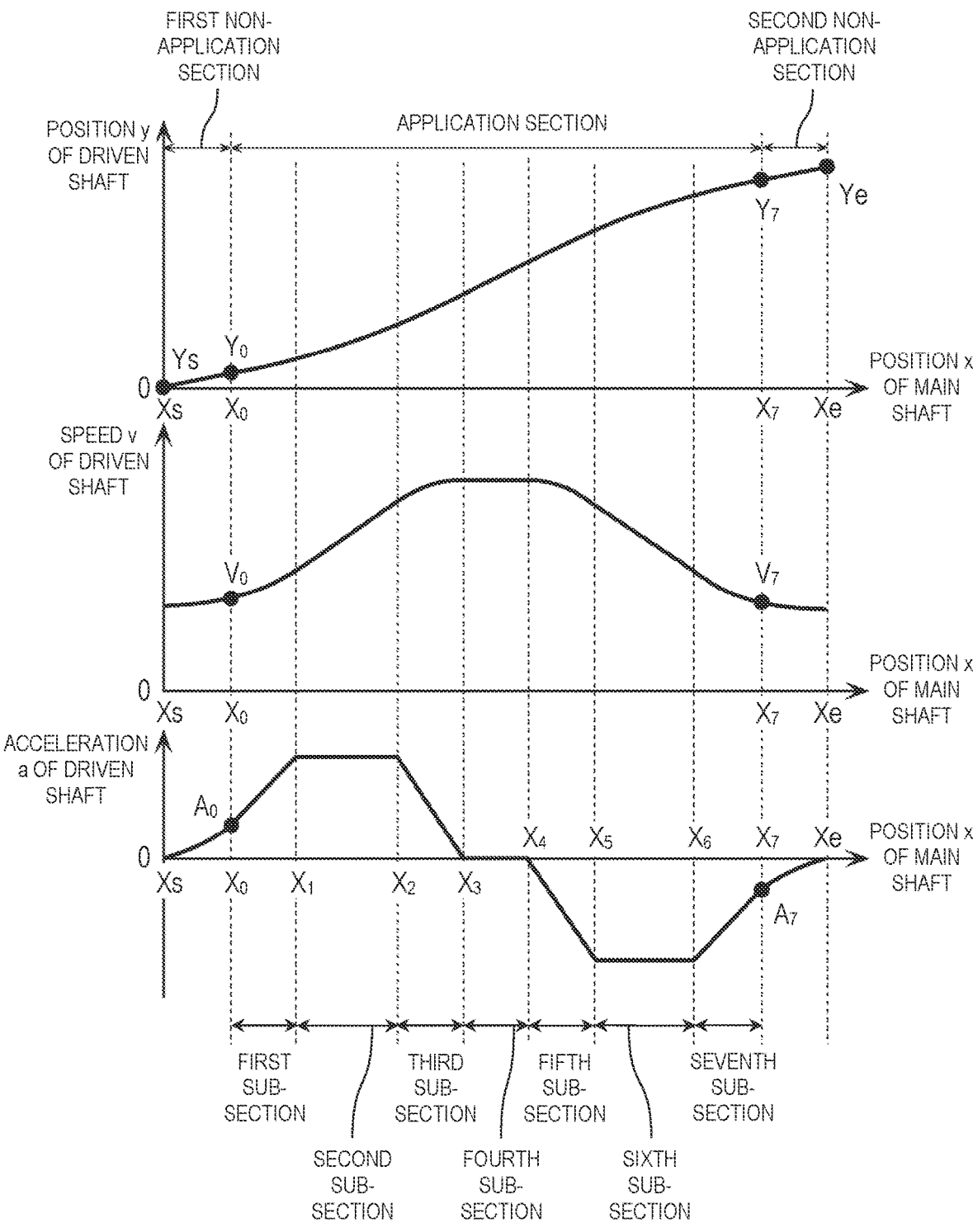
FIG. 4 is a waveform chart illustrating another example of the cam curve according to the first exemplary embodiment.

FIG. 4 is a waveform diagram illustrating another example of the cam curve generated by cam curve generator 70 in the processing in step S60.

FIG. 4 includes a waveform chart in an upper row, the waveform chart showing a cam curve that defines a relationship between a position of the main shaft and a position of the driven shaft. The waveform chart in the upper row has the horizontal axis (x-axis) indicating position x of the main shaft, and the vertical axis (y-axis) indicating position y of the driven shaft.

FIG. 4 includes a waveform chart in a middle row, the waveform chart showing a cam curve that defines a relationship between a position of the main shaft and speed of the driven shaft. The waveform chart in the middle row has the horizontal axis (x-axis) indicating position x of the main shaft, and the vertical axis (v-axis) indicating speed v of the driven shaft.

FIG. 4 includes a waveform chart in a lower row, the waveform chart showing a cam curve that defines a relationship between a position of the main shaft and acceleration of the driven shaft. The waveform chart in the lower row has the horizontal axis (x-axis) indicating position x of the main shaft, and the vertical axis (a-axis) indicating acceleration a of the driven shaft.

FIG. 4 includes the waveform chart in the upper row, the waveform chart in the middle row, and the waveform chart in the lower row, each of which has a first section from position $X_0$ to position $X_7$ of the main shaft, the first section being set as an application section, a second section from position $X_s$ to position $X_0$ of the main shaft, the second section being set as a first non-application section, and a third section from position $X_7$ to position $X_e$ of the main shaft, the third section being set as a second non-application section. That is, the cam curve in the application section from position $X_0$ to position $X_7$ of the main shaft is the cam curve generated by cam curve generator 70 in the processing in step S60.

The application section has the start under a boundary condition set to coordinate values equal to those at the end of the cam curve in the first non-application section, i.e., position $Y_0$ of the driven shaft, speed $V_0$ of the driven shaft, and acceleration $A_0$ of the driven shaft. The application section also has the end under a boundary condition set to coordinate values equal to those at the start of the cam curve in the second non-application section, i.e., position $Y_7$ of the driven shaft, speed $V_7$ of the driven shaft, and acceleration $A_7$ of the driven shaft.

The example illustrated in FIG. 4 shows the application section that is divided into seven sub-sections of a first sub-section, a second sub-section, a third sub-section, a fourth sub-section, and a fifth sub-section, a sixth sub-section, a seventh sub-section that are continuous in an ascending order of the position of the main shaft. The seven sub-sections have boundaries indicated by positions of the main shaft, the positions having respective coordinate values of $X_0$, $X_1$, $X_2$, $X_3$, $X_4$, $X_5$, $X_6$, $X_7$.

The first sub-section, the third sub-section, the fifth sub-section, and the seventh sub-section are each set as a sub-section of a type in which acceleration of the driven shaft monotonically increases or monotonically decreases. The second sub-section and the sixth sub-section are each set as a sub-section of a type in which the acceleration of the driven shaft does not change and has a value other than zero. The fourth sub-section is defined as a sub-section of a type in which the acceleration of the driven shaft does not change and has a value of zero.

The processing in step S60 allows cam curve generator 70 to define acceleration a of the driven shaft in the first sub-section to the seventh sub-section by a function a(x) of position x of the main shaft shown in Expression 9 below. Expression 9 shows $K_{i3}$ (i=1, 3, 5, 7) and $K_{i2}$ (i=1, 2, 3, 5, 6, 7) that are each a coefficient.

(Expression 9)

$$\Delta x = x - X_{i-1} \qquad \text{[Expression 16]}$$

-continued and $$a(x) = \begin{cases} a_i(x) = K_{i2} + K_{i3}\Delta x & , X_{i-1} \le x \le X_i, i = 1, 3, 5, 7 \quad \text{[Expression 17]} \\ a_i(x) = K_{i2} & , X_{i-1} \le x \le X_i, i = 2, 6 \\ a_4(x) = 0 & , X_3 \le x \le X_4 \end{cases}$$

Expression 9 shows acceleration a of the driven shaft in the first sub-section, the third sub-section, the fifth sub-section, and the seventh sub-section, acceleration a having a waveform that is from the start to the end of each sub-section and defined by a linear polynomial of position x of the main shaft. These functions are examples, and as long as acceleration a of the driven shaft monotonically increases or monotonically decreases in the first sub-section, the third sub-section, the fifth sub-section, and the seventh sub-section, the functions in these sections may be any function.

When Expression 9 is integrated at position x of the main shaft, function v(x) defining speed v of the driven shaft in the first sub-section to the seventh sub-section is obtained as Expression 10 below. Expression 10 shows $K_{i1}$ (i=1, 2, 3, 4, 5, 6, 7) that is an integral constant and a coefficient.

(Expression 10)

$$\Delta x = x - X_{i-1} \qquad \text{[Expression 18]}$$

and $$v(x) = \begin{cases} v_i(x) = K_{i1} + K_{i2}\Delta x + \dfrac{1}{2}K_{i3}\Delta x^2 & , X_{i-1} \le x \le X_i, i = 1, 3, 5, 7 \quad \text{[Expression 19]} \\ v_i(x) = K_{i1} + K_{i2}\Delta x & , X_{i-1} \le x \le X_i, i = 2, 6 \\ v_4(x) = K_{41} & , X_3 \le x \le X_4 \end{cases}$$

When Expression 10 is integrated at position x of the main shaft, function y(x) defining position y of the driven shaft in the first sub-section to the seventh sub-section is obtained as Expression 11 below. Expression 11 shows $K_{i0}$ (i=1, 2, 3, 4, 5, 6, 7) that is an integral constant and a coefficient.

(Expression 11)

$$\Delta x = x - X_{i-1} \qquad \text{[Expression 20]}$$

and

[Expression 19]

$$y(x) =$$

$$\begin{cases} y_i(x) = K_{i0} + K_{i1}\Delta x + \dfrac{1}{2}K_{i2}\Delta x^2 + \dfrac{1}{6}K_{i3}\Delta x^2 & , X_{i-1} \le x \le X_i, i = 1, 3, 5, 7 \\ y_i(x) = K_{i0} + K_{i1}\Delta x + \dfrac{1}{2}K_{i2}\Delta x^2 & , X_{i-1} \le x \le X_i, i = 2, 6 \\ y_4(x) = K_{40} + K_{41}\Delta x & , X_3 \le x \le X_4 \end{cases}$$

Expression 9, Expression 10, and Expression 11 include $K_{i3}$ (i=1, 3, 5, 7), $K_{i2}$ (i=1, 2, 3, 5, 6, 7), $K_{i1}$ (i=1, 2, 3, 4, 5, 6, 7), and $K_{i0}$ (i=1, 2, 3, 4, 5, 6, 7), which are each a coefficient of a cam curve or a factor thereof. Although being unknown until the processing in step S60 is performed, these are calculated by cam curve generator 70 in the processing in step S60.

The examples of Expression 9, Expression 10, and Expression 11 have twenty-four unknowns as described above, so that as many conditions as the unknowns, i.e., twenty-four conditions, are required for calculating the unknowns. As described below, the processing in step S60 allows cam curve generator 70 to calculate the twenty-four unknowns based on a total of twenty-four conditions including six boundary conditions at the start and end of the application section, and eighteen continuous conditions at boundaries of each sub-section, including a position of the driven shaft, speed of the driven shaft, and acceleration of the driven shaft.

Boundary conditions $Y_0$, $V_0$, and $A_0$ at the start of the application section illustrated in FIG. 4, i.e., at position $X_0$ of the main shaft in the first sub-section, are substituted into Expression 9, Expression 10, and Expression 11 to obtain three equations shown in Expression 12 below.

(Expression 12)

$$A_0 = a_1(X_0) \rightarrow A_0 = K_{12} \qquad \text{[Expression 22]}$$

$$V_0 = v_1(X_0) \rightarrow V_0 = K_{11}$$

$$Y_0 = y_1(X_0) \rightarrow Y_0 = K_{10}$$

Boundary conditions $Y_7$, $V_7$, $A_7$ at the end of the application section illustrated in FIG. 4, i.e., at position $X_7$ of the main shaft in the seventh sub-section, are substituted into Expression 1, Expression 2, and Expression 3 to obtain three equations shown in Expression 13 below.

(Expression 13)

$$\Delta X_7 = X_7 - X_6 \text{ and} \qquad \text{[Expression 23]}$$

$$A_7 = a_7(X_7) \rightarrow A_7 = K_{72} + K_{73}\Delta X_7 \qquad \text{[Expression 24]}$$

$$V_7 = v_7(X_7) \rightarrow V_7 = K_{71} + K_{72}\Delta X_7 + \frac{1}{2}K_{73}\Delta X_7^2$$

$$Y_7 =$$

$$y_7(X_7) \rightarrow Y_7 = K_{70} + K_{71}\Delta X_7 + \frac{1}{2}K_{72}\Delta X_7^2 + \frac{1}{6}K_{73}\Delta X_7^3$$

When a condition that acceleration a of the driven shaft is continuous at the boundary of each sub-section illustrated in FIG. 4 is given to Expression 9, six equations shown in Expression 14 below are obtained.

(Expression 14)

$$\Delta X_i = X_i - X_{i-1} \text{ and} \qquad \text{[Expression 25]}$$

$$a_1(X_1) = a_2(X_1) \rightarrow K_{12} + K_{13}\Delta X_1 = K_{22} \qquad \text{[Expression 26]}$$

$$a_2(X_2) = a_3(X_2) \rightarrow K_{22} = K_{32}$$

$$a_3(X_3) = a_4(X_3) \rightarrow K_{32} + K_{33}\Delta X_3 = 0$$

-continued $$a_4(X_4) = a_5(X_4) \rightarrow 0 = K_{52}$$

$$a_5(X_5) = a_6(X_5) \rightarrow K_{52} + K_{53}\Delta X_5 = K_{62}$$

$$a_6(X_6) = a_7(X_6) \rightarrow K_{62} = K_{72}$$

When a condition that speed v of the driven shaft is continuous at the boundary of each sub-section illustrated in FIG. 4 is given to Expression 10, six equations shown in Expression 15 below are obtained.

(Expression 15)

$$\Delta X_i = X_i - X_{i-1} \text{ and} \qquad \text{[Expression 27]}$$

$$v_1(X_1) = v_2(X_1) \rightarrow K_{11} + K_{12}\Delta X_1 + \frac{1}{2}K_{13}\Delta X_1^2 = K_{21} \qquad \text{[Expression 28]}$$

$$v_2(X_2) = v_3(X_2) \rightarrow K_{21} + K_{22}\Delta X_2 = K_{31}$$

$$v_3(X_3) = v_4(X_3) \rightarrow K_{31} + K_{32}\Delta X_3 + \frac{1}{2}K_{33}\Delta X_3^2 = K_{41}$$

$$v_4(X_4) = v_5(X_4) \rightarrow K_{41} = K_{51}$$

$$v_5(X_5) = v_6(X_5) \rightarrow K_{51} + K_{52}\Delta X_5 + \frac{1}{2}K_{53}\Delta X_5^2 = K_{61}$$

$$v_6(X_6) = v_7(X_6) \rightarrow K_{61} + K_{62}\Delta X_6 = K_{71}$$

When a condition that position y of the driven shaft is continuous at the boundary of each sub-section illustrated in FIG. 4 is given to Expression 11, six equations shown in Expression 16 below are obtained.

(Expression 16)

$$\Delta X_i = X_i - X_{i-1} \text{ and} \qquad \text{[Expression 29]}$$

$$\text{[Expression 30]}$$

$$y_1(X_1) = y_2(X_1) \rightarrow K_{10} + K_{11}\Delta X_1 + \frac{1}{2}K_{12}\Delta X_1^2 + \frac{1}{6}K_{13}\Delta X_1^3 = K_{20}$$

$$y_2(X_2) = y_3(X_2) \rightarrow K_{20} + K_{21}\Delta X_2 + \frac{1}{2}K_{22}\Delta X_2^2 = K_{30}$$

$$y_3(X_3) = y_4(X_3) \rightarrow K_{30} + K_{31}\Delta X_3 + \frac{1}{2}K_{32}\Delta X_3^2 + \frac{1}{6}K_{33}\Delta X_3^3 = K_{40}$$

$$y_4(X_4) = y_5(X_4) \rightarrow K_{40} + K_{41}\Delta X_4 = K_{50}$$

$$y_5(X_5) = y_6(X_5) \rightarrow K_{50} + K_{51}\Delta X_5 + \frac{1}{2}K_{52}\Delta X_5^2 + \frac{1}{6}K_{53}\Delta X_5^3 = K_{60}$$

$$y_6(X_6) = y_7(X_6) \rightarrow K_{60} + K_{61}\Delta X_6 + \frac{1}{2}K_{62}\Delta X_6^2 = K_{70}$$

The processing in step S60 allows cam curve generator 70 to solve twenty-four simultaneous equations defined by the twenty-four equations shown in Expression 12 to Expression 16 to calculate unknowns $K_{i3}$ (i=1, 3, 5, 7), $K_{i2}$ (i=1, 2, 3, 5, 6, 7), $K_{i1}$ (i=1, 2, 3, 4, 5, 6, 7), and $K_{i0}$ (i=1, 2, 3, 4, 5, 6, 7).

Cam curve generator 70 may calculate corresponding one of the unknowns by solving the twenty-four simultaneous equations each time a cam curve is generated, or may preliminarily store a calculation formula obtained by modifying the twenty-four simultaneous equations and calculate each of the unknowns based on the calculation formula stored.

Next, an example of an effect obtained by cam curve generating device 100 other than the example of the effect, which is obtained by cam curve generating device 100 and described using the example of the cam curve illustrated in FIG. 3, will be described using the example of the cam curve illustrated in FIG. 4.

The cam curve in the application section in FIG. 4 has a fourth sub-section in which speed v of the driven shaft is constant, and position y of the driven shaft, speed v of the driven shaft, and acceleration a of the driven shaft are each continuous at boundaries of each sub-section. As a result, cam curve generating device 100 enables providing electronic cam control that reduces fluctuation in speed of the driven shaft and acceleration of the driven shaft in the application section as compared with electronic cam control using a cam curve generated using a fifth-order curve as in the conventional technique described in PTL 1.

<Consideration>

Cam curve generating device 100 causes the driven shaft to be determined in position, speed, and acceleration at the start and the end of the application section according to boundary conditions acquired. As a result, cam curve generating device 100 enables generating a cam curve having a smooth connection to an out-section cam curve outside the application section by appropriately setting a boundary condition to be acquired.

Cam curve generating device 100 determines speed of the driven shaft and acceleration of the driven shaft in the application section according to a division condition acquired. As a result, cam curve generating device 100 enables generating a cam curve that reduces fluctuations in speed of the driven shaft and in acceleration of the driven shaft in the application section by appropriately setting a division condition to be acquired.

Thus, cam curve generating device 100 enables generating a cam curve that reduces fluctuations in speed of the driven shaft and in acceleration of the driven shaft in an application section while being smoothly connected to an out-section cam curve.

Second Exemplary Embodiment

Hereinafter, a cam curve generation system according to a second exemplary embodiment will be described in which a configuration is partially different from the configuration of cam curve generation system 1 according to the first exemplary embodiment.

<Configuration>

Figure 5:
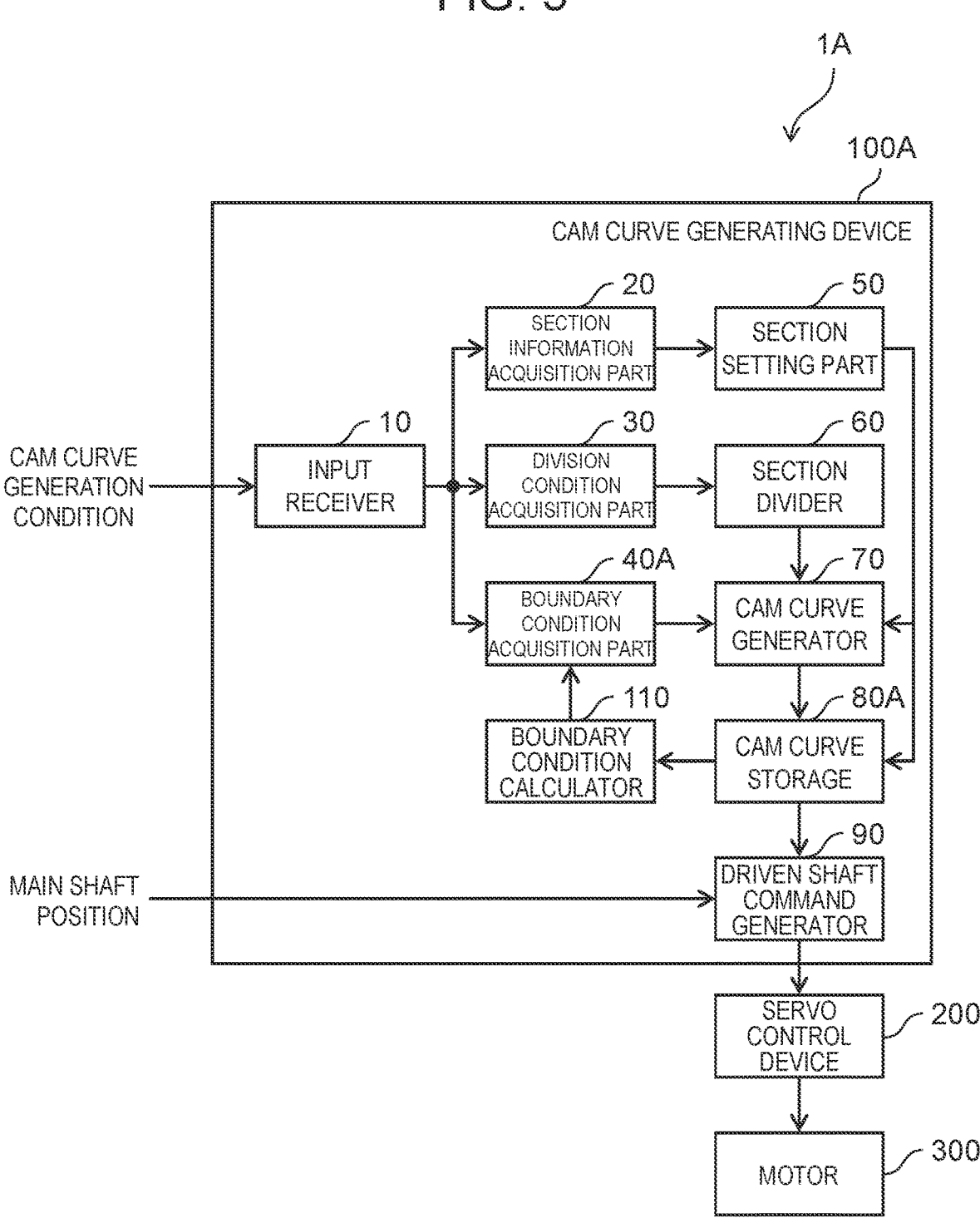
FIG. 5 is a block diagram illustrating an example of a configuration of a cam curve generation system according to a second exemplary embodiment.

FIG. 5 is a block diagram illustrating an example of a configuration of cam curve generation system 1A according to a second exemplary embodiment.

As illustrated in FIG. 5, cam curve generation system 1A has a configuration different from that of cam curve generation system 1 according to the first exemplary embodiment in that cam curve generating device 100 is changed to cam curve generating device 100A. Then, cam curve generating device 100A has a configuration different from that of cam curve generating device 100 according to the first exemplary embodiment in that boundary condition acquisition part 40 is changed to boundary condition acquisition part 40A, cam curve storage 80 is changed to cam curve storage 80A, and boundary condition calculator 110 is added.

Cam curve storage 80A has not only functions of cam curve storage 80 according to the first exemplary embodiment, but also a function below. That is, cam curve storage 80A stores a cam curve generated in advance by an external device.

Thus, cam curve storage 80A stores the cam curve generated by cam curve generator 70 or the cam curve generated in advance by the external device. Hereinafter, the "cam curve generated by cam curve generator 70" or the "cam curve generated in advance by the external device" stored in cam curve storage 80A is referred to as an "existing cam curve".

Boundary condition calculator 110 calculates values from the existing cam curve stored in cam curve storage 80A, the values including: a first position of the driven shaft at a first position of the main shaft; first speed of the driven shaft at the first position of the main shaft; first acceleration of the driven shaft at the first position of the main shaft; a second position of the driven shaft at a second position of the main shaft at a time after the first position of the main shaft, second speed of the driven shaft at the second position of the main shaft; and second acceleration of the driven shaft at the second position of the main shaft.

Here, boundary condition calculator 110 may acquire the first position of the main shaft and the second position of the main shaft from the outside, or may store the first position of the main shaft and the second position of the main shaft, which are predetermined, instead of acquiring the positions from the outside, for example.

Boundary condition calculator 110 calculates the first position of the driven shaft, the first speed of the driven shaft, the first acceleration of the driven shaft, the second position of the driven shaft, the second speed of the driven shaft, and the second acceleration of the driven shaft. Then, boundary condition calculator 110 defines a first section from the first position of the main shaft to the second position of the main shaft as an application section, and calculates a boundary condition in which the first position of the driven shaft, the first speed of the driven shaft, and the first acceleration of the driven shaft are defined as the position of the driven shaft at the start of the application section, the speed of the driven shaft at the start of the application section, and the acceleration of the driven shaft at the start of the application section, respectively. Boundary condition calculator 110 also calculates a boundary condition where the second position of the driven shaft, the second speed of the driven shaft, and the second acceleration of the driven shaft are respectively defined as a position of the driven shaft at the end of the application section, speed of the driven shaft at the end of the application section, and acceleration of the driven shaft at the end of the application section.

Boundary condition acquisition part 40A has not only functions of boundary condition acquisition part 40 according to the first exemplary embodiment, but also a function below. That is, boundary condition acquisition part 40A acquires the boundary condition calculated by boundary condition calculator 110.

<Operation>

Cam curve generating device 100A having the above configuration performs a second cam curve generation processing of generating a cam curve, for example.

Hereinafter, the second cam curve generation processing to be performed by cam curve generating device 100A will be described with reference to the drawings.

Figure 6:
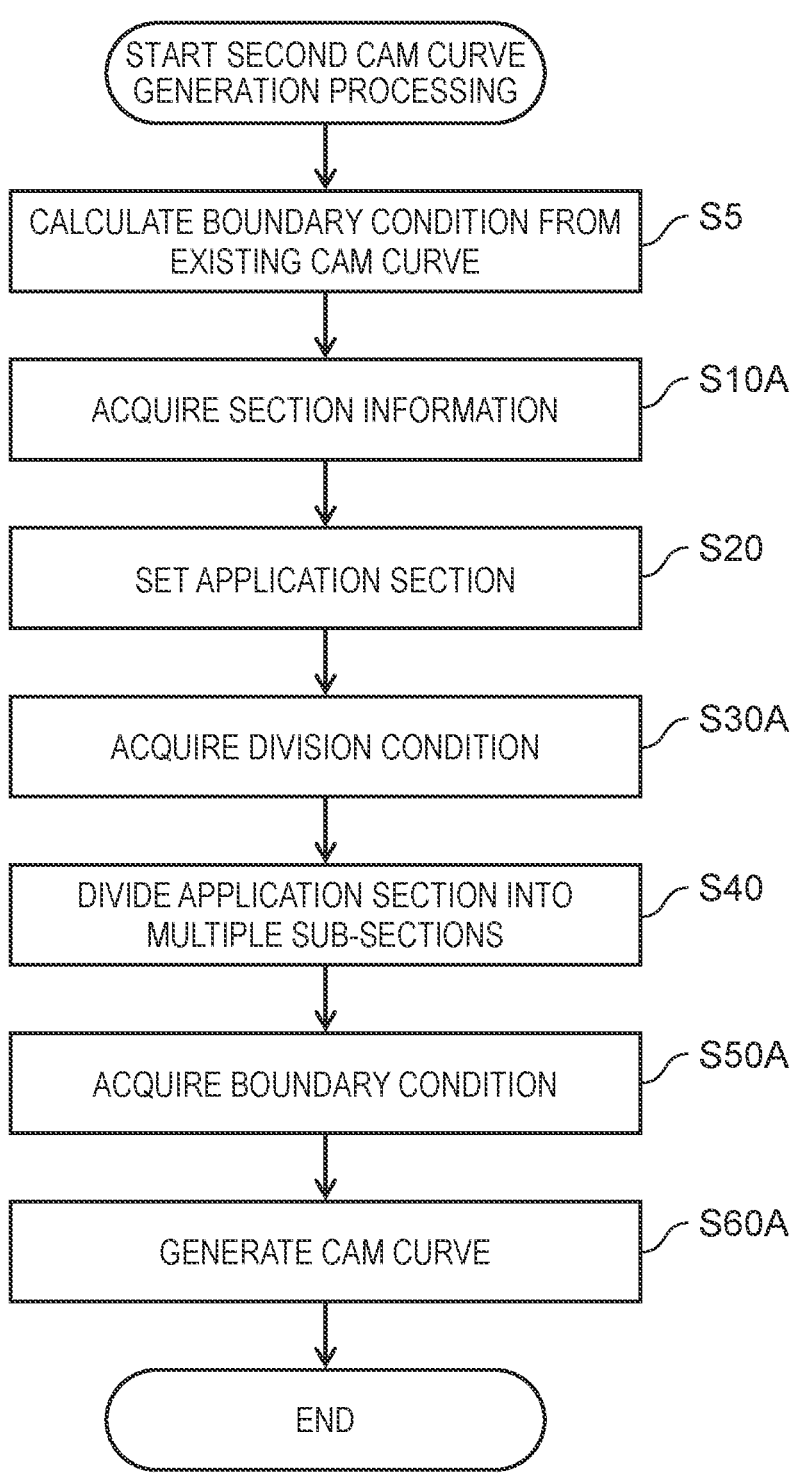
FIG. 6 is a flowchart of a second cam curve generation processing according to the second exemplary embodiment.

FIG. 6 is a flowchart of the second cam curve generation processing.

As illustrated in FIG. 6, the second cam curve generation processing is different from the first cam curve generation processing according to the first exemplary embodiment in that processing in step S5 is added, the processing in step S10 is changed to processing in step S10A, the processing in step S30 is changed to processing in step S30A, the processing in step S50 is changed to processing in step S50A, and the processing in step S60 is changed to processing in step S60A. Thus, the processing in step S5, the processing in step S10A, the processing in step S30A, the processing in step S50A, and the processing in step S60A will be mainly described here.

The second cam curve generation processing is started when cam curve generating device 100A is operated to start the second cam curve generation processing, for example.

When the second cam curve generation processing is started, boundary condition calculator 110 calculates a boundary condition from the existing cam curve stored in cam curve storage 80A while defining the first section as the application section (step S5).

Next, section information acquisition part 20 acquires section information (step S10A). More specifically, section information acquisition part 20 acquires the section information with the first section defined as the application section from the cam curve generation condition received by input receiver 10. Then, the processing proceeds to step S20.

When the processing in step S20 ends, division condition acquisition part 30 acquires a division condition (step S30A). More specifically, division condition acquisition part 30 acquires the division condition with the first section defined as the application section from the cam curve generation condition received by input receiver 10. Then, the processing proceeds to step S40.

When the processing in step S40 ends, boundary condition acquisition part 40A acquires a boundary condition (step S50A). More specifically, boundary condition acquisition part 40A acquires the boundary condition calculated by boundary condition calculator 110.

When the boundary condition is acquired by boundary condition acquisition part 40A, cam curve generator 70 generates a cam curve in the application section, which is the first section, based on the boundary condition acquired by boundary condition acquisition part 40A, the cam curve satisfying the boundary condition. At this time, cam curve generator 70 generates the cam curve that allows a position of the driven shaft, speed of the driven shaft, and acceleration of the driven shaft to be continuous at each of boundaries of the multiple sub-sections based on the information indicating the sub-sections output from section divider 60 (step S60A).

When processing in step S60A ends, cam curve generating device 100A ends the second cam curve generation processing.

<Consideration>

Cam curve generating device 100A enables generating a new cam curve that is smoothly connected to the existing cam curve at the first position of the main shaft and the second position of the main shaft from the existing cam curve previously generated and that has a transition range of the main shaft from the first position of the main shaft to the second position of the main shaft.

Other Exemplary Embodiments

Although the cam curve generating device and the like according to an aspect of the present disclosure have been described above based on the first exemplary embodiment and the second exemplary embodiment, the present disclosure is not limited to these embodiments. Configurations in which various variations conceived by those skilled in the art are applied to the exemplary embodiments, and an aspect formed by combining components in different exemplary embodiments may be included within the scope of one or more aspects of the present disclosure, without departing from the gist of the present disclosure.

(1) The first exemplary embodiment describes cam curve generating device 100 that includes driven shaft command generator 90, for example. However, cam curve generating device 100 is not necessarily limited to the configuration including driven shaft command generator 90. For example, cam curve generating device 100 may not include driven shaft command generator 90, and the function of driven shaft command generator 90 may be implemented by a device outside cam curve generating device 100.

(2) The first exemplary embodiment describes cam curve generating device 100 and servo control device 200 that are independent of each other. However, cam curve generating device 100 and the servo control device 200 do not necessarily need to be configured to be independent of each other. For example, cam curve generating device 100 may be configured to implement the function of servo control device 200.

(3) An aspect of the present disclosure may be not only cam curve generating device 100 or cam curve generating device 100A, but also a cam curve generating method including steps corresponding to characteristic components included in cam curve generating device 100 or cam curve generating device 100A. An aspect of the present disclosure may be a computer program that causes a computer to execute each characteristic step included in the cam curve generating method. Additionally, an aspect of the present disclosure may be a non-transitory computer-readable recording medium on which the above computer program is recorded.

INDUSTRIAL APPLICABILITY

The present disclosure is widely applicable to a cam curve generating device that generates a cam curve for implementing electronic cam control for controlling a position of a driven shaft in synchronization with a position of a main shaft, for example. The cam curve generating device is also useful for industrial equipment that repeatedly and continuously performs a series of processing processes.

REFERENCE MARKS IN THE DRAWINGS 1, 1A: cam curve generation system
10: input receiver
20: section information acquisition part
30: division condition acquisition part
40, 40A: boundary condition acquisition part
50: section setting part
60: section divider
70: cam curve generator
80, 80A: cam curve storage
90: driven shaft command generator
100, 100A: cam curve generating device
110: boundary condition calculator
200: servo control device
300: motor

The invention claimed is:

1. A cam curve generating device that generates a cam curve for controlling a position of a driven shaft of a motor, the cam curve generating device comprising:
   one or more memories; and
   at least one processor coupled to at least one of the one or more memories and configured to perform operations comprising:

acquiring a boundary condition of an application section to be a target of generation of the cam curve in a range in which a main shaft changes in position, acquiring a division condition for dividing the application section into a plurality of sub-sections, dividing the application section into the plurality of sub-sections that satisfy the division condition, generating the cam curve in the application section, the cam curve satisfying the boundary condition, and causing a servo control device to drive the motor based on the cam curve, wherein each of the plurality of sub-sections is any one of types of an increasing sub-section in which acceleration of the driven shaft monotonously increases, a decreasing sub-section in which the acceleration of the driven shaft monotonously decreases, and a constant sub-section in which the acceleration of the driven shaft does not change, the division condition includes a length and a type of each of the plurality of sub-sections, the boundary condition includes a position of the driven shaft, a speed of the driven shaft, and the acceleration of the driven shaft at each of a start and an end of the application section, and the generating comprises generating the cam curve that allows a position of the driven shaft, speed of the driven shaft, and the acceleration of the driven shaft to be continuous at each of boundaries of the plurality of sub-sections.

2. The cam curve generating device according to claim 1, wherein the cam curve includes at least one sub-section of the increasing sub-section and the decreasing sub-section, and the generating comprises generating the cam curve with a waveform of the acceleration of the driven shaft from a start to an end of the at least one sub-section, the waveform having a shape of a ¼ period part up to an apex of a sine wave.

3. The cam curve generating device according to claim 1, wherein the cam curve includes at least one sub-section of the increasing sub-section and the decreasing sub-section, and the generating comprises generating the cam curve with a waveform of the acceleration of the driven shaft from a start to an end of the at least one sub-section, the waveform having a shape of a half period part from the apex of the sine wave.

4. The cam curve generating device according to claim 1, wherein the cam curve includes at least one sub-section of the increasing sub-section and the decreasing sub-section, and the generating comprises generating the cam curve with a waveform of the acceleration of the driven shaft from a start to an end of the at least one sub-section, the waveform having a shape of a ¼ period part from the apex of the sine wave.

5. The cam curve generating device according to claim 1, wherein the cam curve includes at least one sub-section of the increasing sub-section and the decreasing sub-section, and the generating comprises generating the cam curve with a waveform of the acceleration of the driven shaft from a start to an end of the at least one sub-section, the waveform being defined by a linear polynomial of a position of the main shaft.

6. The cam curve generating device according to claim 1, wherein the plurality of sub-sections are five sub-sections that include a first sub-section, a second sub-section, a third sub-section, a fourth sub-section, and a fifth sub-section, and that are sequentially continuous, the first sub-section, the third sub-section, and the fifth sub-section are each the increasing sub-section or the decreasing sub-section, and the second sub-section and the fourth sub-section are each the constant sub-section.

7. The can curve generating device according to claim 6, wherein the acceleration of the driven shaft in the second sub-section and the fourth sub-section has a value other than zero.

8. The cam curve generating device according to claim 1, wherein the plurality of sub-sections are seven sub-sections that include a first sub-section, a second sub-section, a third sub-section, a fourth sub-section, a fifth sub-section, a sixth sub-section, and a seventh sub-section and that are sequentially continuous, the first sub-section, the third sub-section, the fifth sub-section, and the seventh sub-section are each the increasing sub-section or the decreasing sub-section, and the second sub-section, the fourth sub-section, and the sixth sub-section are each the constant sub-section.

9. The cam curve generating device according to claim 8, wherein the acceleration of the driven shaft in the second sub-section and the sixth sub-section has a value other than zero, and the acceleration of the driven shaft in the fourth sub-section is zero.

10. The cam curve generating device according to claim 1, wherein the operations further comprise dividing a range in which the main shaft changes in position into the application section and a non-application section other than the application section.

11. The cam curve generating device according to claim 1, wherein the operations further comprise:

storing an existing cam curve generated in advance; and calculating values from the existing cam curve, the values including: a first position of the driven shaft at a first position of a main shaft; first speed of the driven shaft at the first position of the main shaft; first acceleration of the driven shaft at the first position of the main shaft; a second position of the main shaft at a time after the first position of the main shaft; second speed of the driven shaft at the second position of the main shaft; and second acceleration of the driven shaft at the second position of the main shaft, and that calculates boundary conditions in which a first section from the first position of the main shaft to the second position of the main shaft is defined as the application section in the range in which the main shaft changes in position in the existing cam curve, the boundary conditions including: a first boundary condition where the first position of the driven shaft, the first speed of the driven shaft, and the first acceleration of the driven shaft are respectively defined as a position of the driven shaft at the start, speed of the driven shaft at the start, and acceleration of the driven shaft at the start; and a second boundary condition where the second position of the driven shaft, the second speed of the driven shaft, and the second acceleration of the driven shaft are respectively defined as a position of the driven shaft at the end, speed of the driven shaft at the end, and the acceleration of the driven shaft at the end, wherein the acquiring the boundary condition comprises acquiring the boundary conditions, the acquiring the division condition comprises acquiring the division condition where the first section is defined as the application section, the dividing comprises defining the first section as the application section and divides the application section into the plurality of sub-sections, and the generating comprises generating the cam curve with the first section as the application section.

12. The cam curve generating device according to claim 1, wherein the range in which the main shaft changes in position includes a section other than the application section, the section being defined as a non-application section, the boundary condition includes a third boundary condition at the start of the application section, the third boundary condition being set to a position of the driven shaft, speed of the driven shaft, and the acceleration of the driven shaft in the non-application section at time corresponding to the start, and a fourth boundary condition at the end of the application section, the fourth boundary condition being set to a position of the driven shaft, speed of the driven shaft, and the acceleration of the driven shaft in the non-application section at time corresponding to the end.

13. A cam curve generating method for generating a cam curve for controlling a position of a driven shaft of a motor, the cam curve generating method comprising:

a first step of acquiring a boundary condition of an application section to be a target of generation of the cam curve in a range in which a main shaft changes in position;

a second step of acquiring a division condition for dividing the application section into a plurality of sub-sections;

a third step of dividing the application section into the plurality of sub-sections that satisfy the division condition; and a fourth step of generating the cam curve in the application section, the cam curve satisfying the boundary condition, wherein each of the plurality of sub-sections is any one of types of an increasing sub-section in which acceleration of the driven shaft monotonously increases, a decreasing sub-section in which the acceleration of the driven shaft monotonously decreases, and a constant sub-section in which the acceleration of the driven shaft does not change, the division condition includes a length and a type of each of the plurality of sub-sections, the boundary condition includes a position of the driven shaft, speed of the driven shaft, and the acceleration of the driven shaft at each of a start and an end of the application section, the fourth step is performed to generate the cam curve that allows a position of the driven shaft, speed of the driven shaft, and the acceleration of the driven shaft to be continuous at each of boundaries of the plurality of sub-sections, and the method further comprises causing a servo control device to drive the motor based on the cam curve.

14. The cam curve generating method according to claim 13, wherein the cam curve includes at least one sub-section of the increasing sub-section and the decreasing sub-section, and the generating comprises generating the cam curve with a waveform of the acceleration of the driven shaft from a start to an end of the at least one sub-section, the waveform having a shape of a ¼ period part up to an apex of a sine wave.

15. The cam curve generating method according to claim 13, wherein the cam curve includes at least one sub-section of the increasing sub-section and the decreasing sub-section, and the generating comprises generating the cam curve with a waveform of the acceleration of the driven shaft from a start to an end of the at least one sub-section, the waveform having a shape of a half period part from the apex of the sine wave.

16. The cam curve generating method according to claim 13, wherein the cam curve includes at least one sub-section of the increasing sub-section and the decreasing sub-section, and the generating comprises generating the cam curve with a waveform of the acceleration of the driven shaft from a start to an end of the at least one sub-section, the waveform having a shape of a ¼ period part from the apex of the sine wave.

17. The cam curve generating method according to claim 13, wherein the cam curve includes at least one sub-section of the increasing and the decreasing sub-section, and the generating comprises generating the cam curve with a waveform of the acceleration of the driven shaft from a start to an end of the at least one sub-section, the waveform being defined by a linear polynomial of a position of the main shaft.

18. The cam curve generating method according to claim 13, wherein the plurality of sub-sections are five sub-sections that include a first sub-section, a second sub-section, a third sub-section, a fourth sub-section, and a fifth sub-section, and that are sequentially continuous, the first sub-section, the third sub-section, and the fifth sub-section are each the increasing sub-section or the decreasing sub-section, and the second sub-section and the fourth sub-section are each the constant sub-section.

19. The can curve generating method according to claim 18, wherein the acceleration of the driven shaft in the second sub-section and the fourth sub-section has a value other than zero.

20. The cam curve generating method according to claim 13, wherein the plurality of sub-sections are seven sub-sections that include a first sub-section, a second sub-section, a third sub-section, a fourth sub-section, a fifth sub-section, a sixth sub-section, and a seventh sub-section and that are sequentially continuous, the first sub-section, the third sub-section, the fifth sub-section, and the seventh sub-section are each the increasing or the decreasing sub-section, and the second sub-section, the fourth sub-section, and the sixth sub-section are each the constant sub-section.

* * * * *